United States Patent [19]
Venier et al.

[11] Patent Number: 5,768,358
[45] Date of Patent: *Jun. 16, 1998

[54] METHOD AND APPARATUS FOR ROUTING A CALL TO A NUMBER CORRESPONDING TO A VIRTUAL PUBLIC DIAL PLAN OR TO AN EXISTING DIAL PLAN

[75] Inventors: Daniel J. Venier; L. Lloyd Williams; R. William Carkner, all of Kanata; Morlen R. Reynolds, Sarsfield, all of Canada

[73] Assignee: Stentor Resource Centre Inc., Ottawa, Canada

[*] Notice: The term of this patent shall not extend beyond the expiration date of Pat. No. 5,583,926.

[21] Appl. No.: 496,442

[22] Filed: Jun. 29, 1995

Related U.S. Application Data

[63] Continuation-in-part of Ser. No. 366,650, Dec. 30, 1994, Pat. No. 5,583,926.

[51] Int. Cl.$^6$ .................................................. H04M 3/42
[52] U.S. Cl. ........................... 379/207; 379/201; 379/220; 379/229
[58] Field of Search ..................................... 379/201, 207, 379/211, 216, 220, 221, 225, 229, 219, 234, 230

[56] References Cited

U.S. PATENT DOCUMENTS

| | | | |
|---|---|---|---|
| 4,348,554 | 9/1982 | Asmuth | 379/113 |
| 4,802,199 | 1/1989 | Lange et al. | 379/221 |
| 5,247,571 | 9/1993 | Kay et al. | 379/230 |
| 5,339,356 | 8/1994 | Ishii | 379/234 |
| 5,343,517 | 8/1994 | Bogart et al. | 379/219 |
| 5,375,167 | 12/1994 | Bales et al. | 379/207 |
| 5,377,186 | 12/1994 | Wegner et al. | 370/62 |
| 5,404,395 | 4/1995 | Bogart et al. | 379/201 |
| 5,455,855 | 10/1995 | Hokari | 379/229 |

FOREIGN PATENT DOCUMENTS

| | | |
|---|---|---|
| 1120164 | 3/1982 | Canada. |
| 1129054 | 8/1982 | Canada. |
| 1228659 | 10/1987 | Canada. |
| 1252861 | 4/1989 | Canada. |

OTHER PUBLICATIONS

Virtual Private Network Call Processing In The Intelligent Network, M. Atoui, pp. 561–565, Supercomm/International Conference On Communications, Session 321, Paper 1, vol. 2, Jun. 14, 1992.
Local Area Number Portability (LANP), S.L. Ackley, et al, Electric Lightwave, Inc., Aug. 21, 1994, entire document.
Local Area Number Portability (LANP) Second Contribution, Electric Lightwave, Inc., Sep. 20, 1994, entire document.
Recommendations for #XXX Abbreviated Dialing Plan, Bellsouth Telecommunications, Inc., J. Waugh, Jun. 1, 1994, entire document.

*Primary Examiner*—Krista M. Zele
*Assistant Examiner*—Scott Wolinsky
*Attorney, Agent, or Firm*—Foley & Lardner

[57] ABSTRACT

A method for creating a virtual public numbering domain, which will coexist with and be parallel and non-intrusive to the existing geographic North American telephone network numbering plan is disclosed. It will have sufficient capacity to provide additional and more flexible numbering resources which will stimulate and enable many new service applications. The existing telephone network infrastructure has digital switching points and a database system. The method includes receiving at one of the digital switching points a called number, and verifying whether the number called is a number of the virtual public dial plan. If the number called is a number of the virtual public dial plan, the method includes forming with the number called a virtual public address of predetermined length, supplying the virtual public address to the database system to determine a corresponding network node address, supplying the corresponding network node address to the digital switching point and routing the call through the network infrastructure according to the existing dial plan. If the number called is a number of the existing dial plan, the call is routed through the network infrastructure according to the existing dial plan and the number called.

14 Claims, 19 Drawing Sheets

METHOD AND APPARATUS FOR ROUTING A CALL TO A NUMBER CORRESPONDING TO A VIRTUAL PUBLIC DIAL PLAN OR TO AN EXISTING DIAL PLAN

CROSS-REFERENCES TO RELATED APPLICATIONS

This is a continuation-in-part application of patent application Ser. No. 08/366,650 filed Dec. 30, 1994, and issued as U.S. Pat. No. 5,583,926 on Dec. 10, 1996.

BACKGROUND OF THE INVENTION a) Field of the Invention

The present invention is concerned with a method and apparatus used to create a virtual public numbering domain, which will coexist with, be parallel and non-intrusive to the existing geographic North American telephone network numbering plan.

b) Brief Description of the Related Art

Although efforts are being made to solve some of today's network problems, the solutions offered are still constrained by the rigid rules of today's North American numbering plan. That is, each telephone subscriber has a number in the NXX-NXX-XXXX format, where N represents a digit from 2–9 and X represents a digit from 0–9. The first group of three digits indicate the area code or NPA of the subscriber, the second group of three digits indicate a switching exchange or service switching point to which the subscriber is connected to, and the last group of four digits indicate the address of the subscriber within the service switching point. Digits 0 and 1 are of course not available at the first digit(N) to allow operator and long distance services. This rule in effect eliminates more than $2 \times 10^9$ combinations of telephone numbers.

With the large increase in telephone devices of one sort or another, an equivalent increase in the demand of telephone numbers has been created. For example, 15 years ago, most telephone numbers were used for fixed POTS devices. Today, more and more users make use of several devices, such as cellular telephones, pagers, fax machines, modems, etc. This demand has placed a large impact on the pool of numbers available for customers. In some instances, metropolitan areas that used to be served by one area code, now require several. The problem is of course compounded by the need to assign new telephone numbers to subscribers that move from one region to another.

To help reduce this need for new numbers, network facilitators have been unsuccessfully researching options for delivering a service where telephone numbers are not tied to equipment locations.

New telephone networks with Advanced intelligent network (AIN) concepts have been proposed to support faster development of new services through a network architecture in which network functions and interfaces are standardized providing greater independence between service software and technology.

Two telephone service applications which make use of AIN technology for separating dialing from physical routing address are Local Area Portability and Abbreviated Dialing applications.

The Industry Numbering Committee (INC) 9 and 10 Number Portability workshops have studied the Local Area Portability application. INC has received a number of contributions. One of the submission received was from Electric Lightwave Inc. (ELI). In their document entitled "Local Area Number Portability (LANP) (an AIN 0.1 database service), by Sherman L. Ackley, there is described a new approach to number portability within a metropolitan area using the Advanced Intelligent Network 0.1 capabilities. This submission was prepared to introduce the industry to the concept of implementing number portability on a metropolitan area basis, without affecting call routing by switches external to the LANP metropolitan area. Unfortunately, the proposed LANP concept offers several disadvantages. Firstly, the concept precludes the availability of a choice to a caller. That is, regardless of whether you want it or not, the LANP concept must be used. Secondly, the ELI submission necessitates the overnight cutover of the entire exchange or metropolitan area, and the customer addresses must still adhere to the inflexible numbering format. Finally, the ELI approach forces all calls to query a database, which is impractical based on current network and database capacities.

The Information Industry Liaison Committee (IILC) is considering the Abbreviated Dialing application in its issue ESPR-036 entitled "Local calling area abbreviated dialing access to information and enhanced services", and has studied different possibilities with the objective being the ability for telcos to offer abbreviated or shortened dialing sequences within a local calling area. This committee agreed that the following four abbreviated dialing formats appeared more feasible from a technical and marketing standpoint: #XXX, #XXXX, NXX# and NXXX#, where # represents a symbol key on the telephone set, X represents digits 0 through 9, and N represents digits 2 through 9. This committee could not conclude on a method to provide the abbreviated dialing functionality but agreed that AIN developments should be planned to include functions to provide this service capability in AIN Release 1 (Subset 0.1 and 0.2). Unfortunately, this dialing format using a proposed fixed 4-digit length is constrained to 10 000 possible subscribers, is limited to abbreviated dialing only and limited to local calling area.

Bell South Telecommunications has contributed to the INC discussion on abbreviated dialing with their submission entitled "Recommendation of #XXX as a national abbreviated dialing plan" of Jun. 1, 1994. In this document, Bell South Telecommunications reviews the results of the Information Industry Liaison Committee (IILC) ESPR-036 and supports the use of #XXX with expansion to #XXXX as a national abbreviated dialing plan and further suggests that #XXX should be segmented into national and non-national numbers and administered by a single administrator. The contribution from Bell South does not give any indication as to the method proposed to provide this abbreviated dialing plan or whether it could be made possible on the existing network.

A need therefore exists for providing a public numbering plan and method of routing a call through the existing network which overcomes the above shortcomings.

SUMMARY OF THE INVENTION

It is therefore an object of the present invention to provide a parallel, non-intrusive virtual public numbering plan which can coexist with the existing public numbering plan and without being limited by the constraints of the North American numbering plan.

Another object of the present invention is to provide a parallel, non-intrusive virtual public numbering plan which can still be routed via the existing telephone network infrastructure.

Another object of the present invention is to provide a parallel, non-intrusive virtual public numbering plan which enables a caller to enter an access code to enter a virtual public dial plan from any telephone station in the network.

Another object of the present invention is to provide a parallel, non-intrusive virtual public numbering plan which enables a caller to enter an abbreviated dialing code via the existing telephone network infrastructure.

Another object of the present invention is to provide a parallel, non-intrusive virtual public numbering plan which enables a caller to select one of a number of telephone devices associated with a single virtual telephone number.

Another object of the present invention is to provide a parallel, non-intrusive virtual public numbering plan which enables a caller to dial a virtual, public telephone number having 1 to 10 digits, each digit ranging from 0 to 9.

In accordance with the present invention, there is provided, in a telephone network having a number of telephone switching offices equipped with SSPs (Service Switching Points) operating with AIN (Advanced Intelligent Network) application software, and a remotely located SCP (Service Control Point) adapted to receive, when required, SS7 (Signalling System 7) messages from the SSPs to translate a dialed number to enable the routing of a call on the telephone network, a method of providing a parallel, non-intrusive virtual public dial plan (VPDP), co-existing with the North American Numbering Plan (NANP), to enable a calling party to dial a virtual, public telephone number having 1 to 10 digits, each digit ranging from 0 to 9, comprising the steps of:

a) providing a VPDP access code which, when dialed by the user as a prefix to the virtual, public telephone number, enables a calling party to reach a destination station according to the VPDP, the VPDP access code comprising at least one diallable non-numeric character;

b) enabling AIN capable SSPs to launch a query to the SCP when the VPDP access code is detected; and c) providing a VPDP to NANP translation table at the SCP, such that when the virtual, public telephone number dialed by the calling party is received at the SCP, the dialed number can be translated to an NNA of said NANP for routing to the destination station.

BRIEF DESCRIPTION OF THE DRAWINGS

In order to impart full understanding of the manner in which this object and others are attained in accordance with the present invention, preferred embodiments thereof will be described hereinafter with reference to the accompanying drawings wherein.

In the following description and the drawings, the same reference numerals will refer to the same structural elements.

DESCRIPTION OF THE PREFERRED EMBODIMENTS

In order to lighten the following description, the following acronyms will be used:

AIN: Advanced Intelligent Network;
AIN CCIS: SS7 network signalling;
AIN CCS7: SS7 network signalling;
AIN PODP: AIN Public Office Dial Plan;
AIN SCP: AIN Service Control Point;
CLID: Calling Line Identification;
CNA: Customer Number Address;
DTMF: Dual Tone Multi-Frequency;
ISCP: AIN Database;
ISDN: Integrated Services Digital Network;
ISUP: ISDN User Part;
NANP: North American Numbering Plan;
NNA: Network Node Address;
PSTN: Public Switching Telephone Network;
SCP: Signalling Control Point;
SPCS: Service Program Control Switch;
SSP: Service Switching Point;
STP: Signalling Transfer Point;
TCAP: Transaction Capabilities Application Part.

In the following description, "subscriber" refers to an owner of a number called, "caller" refers to a user calling a number, "existing dial plan" refers to the North American Numbering Plan (NANP) or any similar dial plan and "virtual public dial plan" (VPDP) refers to a dial plan in which numbers are not tied to the existing network infrastructure, available universally to all telephones, and functioning in parallel with the existing dial plan, a "virtual public number" is a valid dialing sequence in the VPDP, a "virtual public address" is an address of predetermined length formed from a virtual public number, VPDP Access Code is a predetermined prefix code used to drive the call toward an AIN office based Trigger (# is used as an example of a VPDP Access Code for the remainder of this document). It should be pointed out that where telephone key pads are expanded to include additional codes, (i.e. 4×4 pad instead of standard 3×4 pad), the additional digits are viewed as codes identical to the # sign.

Figure 1:
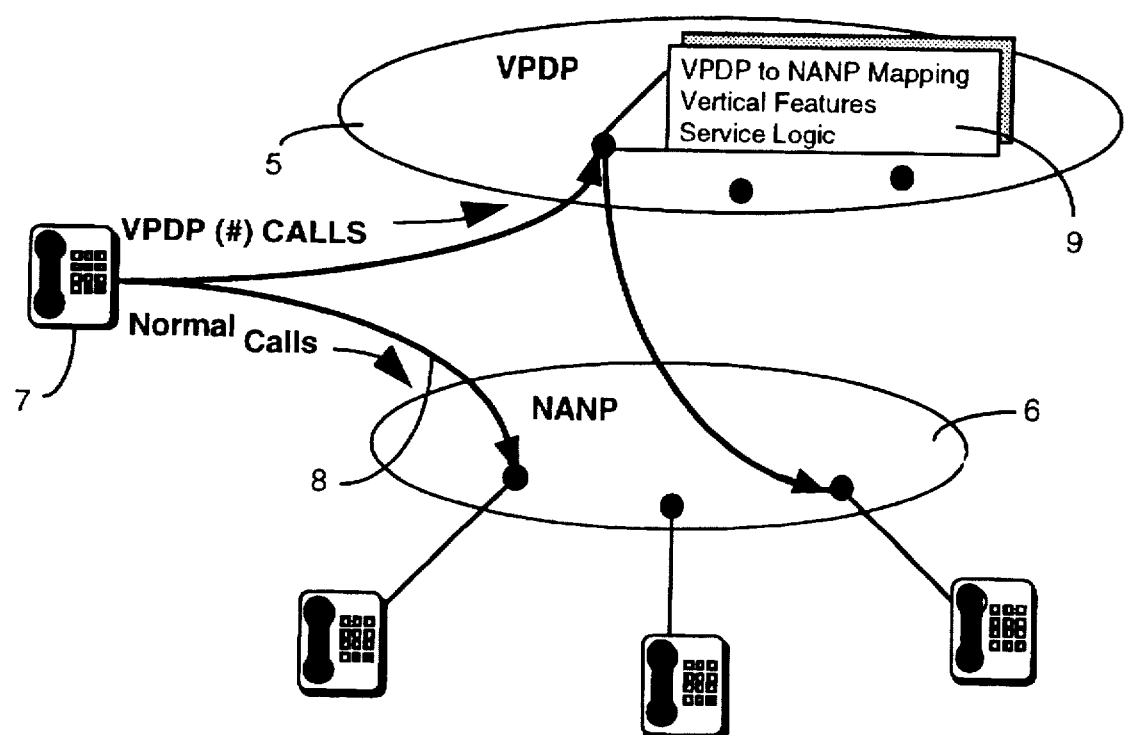
FIG. 1 is a diagram illustrating generally, how calls can be routed to a virtual public dial plan according to the present invention.

As illustrated in FIG. 1, the present invention introduces a Virtual Public Dial Plan (VPDP). One of the advantages of the VPDP is that it is not limited to the same numbering constraints as the North American Numbering Plan (NANP). In addition, VPDP can be introduced in a non-intrusive way into the public switch network without affecting the North American Numbering Plan. As shown, the virtual public dial plan, illustrated by island 5, is parallel to the North American Numbering Plan, illustrated by island 6. By being non-intrusive, VPDP can be gradually introduced without the large up-front cost and network impacts normally associated with modifications to the North American Numbering Plan. The availability of a virtual public dial plan, without the constraints of standardized numbering parameters of the North American networks, opens the possibility for several new services, such as personal code access dialing and flexible vanity dialing.

In addition, by being coexistent with the NANP, the VPDP can terminate a call into the existing numbering plan provided by NANP without additional service features.

One of the key elements of the VPDP is the use of an access code dialed by callers, say, at calling station 7, to enter the virtual public dial plan 5. The VPDP access code is a predetermined prefix code which, when received by a local telephone switch (not shown) used as a service switching point (SSP) enables the calling party to exit the North American Numbering Plan and enter the virtual public dial plan 5. Although the present invention proposes the use of the octothorpe key, which is the # key, as a switch to enter the VPDP, the VPDP access code can be any character or series of characters not used in the North American Numbering Plan. Following the VPDP access code is a series of digits used as a service discriminator. These digits or their alphabetical equivalents are used by a calling party at calling station 7 to reach a service or subscriber. Since these digits are not limited to the traditional dialing sequence or telephone numbers used in NANP, a user can access various services by dialing a virtual, public telephone number having 1-10 digits, each digit ranging from 0 to 9. Although the virtual public telephone numbers will initially have 1 to 10 digits, these can expand to 15 once AIN 0.1 is available. The network has a potential to handle a range of up to 32 digits once networks evolution makes them capable of porting sufficient digits from end offices without AIN trigger capabilities. Thus, the VPDP service subscriber can list any alphabetical "telephone number" of their choice without being limited to digit sequences normally associated with the NANP.

A user can access these services by dialing the VPDP access code, i.e. number sign # as a prefix, an abbreviated dialing sequence and a second # sign indicating the end of dialing. Calls made without the # sign or VPDP access code shown at arrow 8, are treated as normal calls and therefore enter the standard North American Numbering Plan (NANP) network. When a VPDP call is made, the local switch or service switch point (SSP) will recognize the call as a VPDP call by detecting the presence of the # sign and route the call using AIN technology in conjunction with a switch trigger to a signalling transfer point (STP) and eventually to a signalling control point (SCP) for access to a virtual number translation database illustrated by box 9 in FIG. 1.

Figure 2:
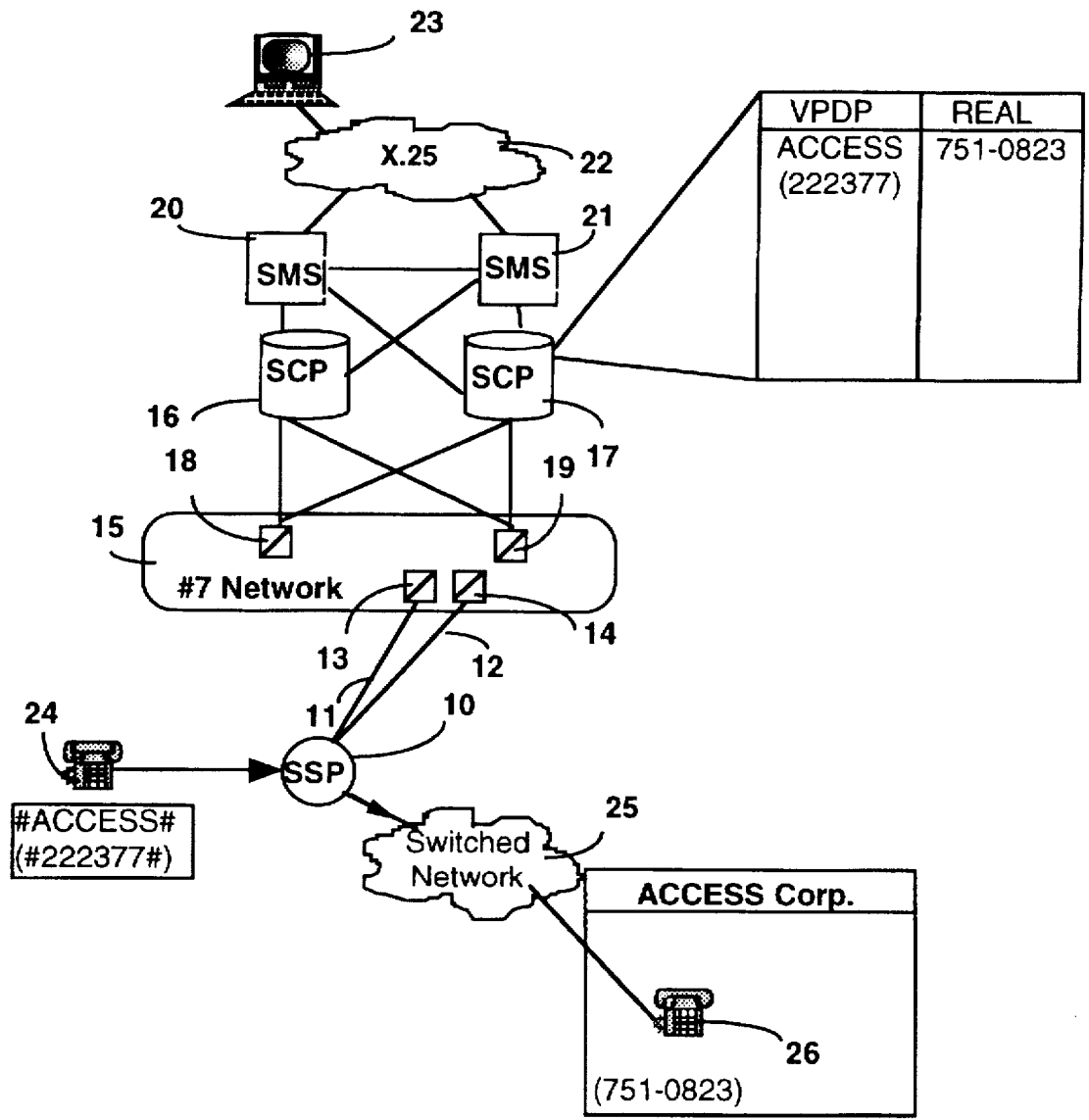
FIG. 2 is a diagram showing network elements which can be used for providing a virtual public dial plan.

Referring now to FIG. 2, we have shown the network infrastructure which can be used to provide the service of the present invention. A typical SS7 network consists of signalling links and nodes. SS7 nodes are referred to as signaling points (SP) and are interconnected by signaling links. Each SS7 signalling node is assigned a unique point code, serving as the network address for message routing. SS7 signaling nodes include Services Signaling Points (SSP), Service Control Points (SCP), and Signal Transfer Points (STP).

Services Signaling Points (SSP) such as referred to at reference numeral 10 are generally considered SS7 equipped telephone exchanges with the capability to launch TCAP queries to an SCP database. SSPs are capable of sending and receiving SS7 messages with other SS7 equipped telephone offices or with Service Control Points, and routing calls based on the information exchanged. Incoming messages are formatted and transferred to the relevant processing function in the switch. Outgoing messages are transmitted over the signaling links.

Service Control Points (SCP) such as shown at reference numeral 16 and 17 are often referred to as the SS7 services data bases. One or more SCPs can serve as a central intelligence point in the network for determining how and if calls are to be routed through the network. Queries and responses to and from the SCP are carried over SS7 signalling links in the form of packet messages, each containing the source and destination address.

Signal Transfer Points (STP), shown at numerals 13, 14, 18 and 19, are special SS7 nodes which provide a message switching function between other nodes in a SS7 network. Acting as a packet switch, it examines incoming messages and then routes them over the appropriate signalling link to the proper destination switching offices and data bases. In this particular function, it supports end-to-end signaling, i.e. in transit (local, tandem and toll) connections, required for transaction messaging used for special services. Unlike other SS7 nodes, the STP does not generally act as a source or sink for SS7 messages. Positioned as a focal point in the SS7 network, the STP serves to concentrate, and thereby, reduce the number of required signaling links. For interconnections with other networks, the STP provides a formal SS7 interface point with message screening to prevent unauthorized access to the network.

It should be noted that when the number sign is dialed in today's switched public wire line network, a standard treatment tone is heard because the use of the # sign for special services is not widely available. Thus, the number translation in each SSP, which is used to perform call logic is modified to route to an SSP AIN trigger which will launch a TCAP query In FIG. 2, a switch 10 equipped with AIN software serves as an SSP (Service Switching Point) for number translation services. Switch 10 has SS7 signaling links 11 and 12 connecting to an STP (Signaling Transfer Point) pair 13 and 14. On the other side of the SS7 network 15, load-sharing SCPs 16 and 17 are connected to the same or another mated pair of STPs 18 and 19. SCPs 16 and 17 contain the services database. They perform the translation functions and returns a response containing routing and billing information to the SSP 10. The two SCPs, each with replicated data, are configured as load-sharing reliability mates. That is, during normal operation, each SCP handles one half of the query traffic. In the failure mode, the remaining operational SCP assumes full load.

A service provider can access the SMS (Service Management System) 20 and 21 via an X.25 network 22 or any supported data interface protocol, using GUI (Graphical User Interface) workstations, or block-mode character terminals 23. Each of the two SMSs is co-located with an SCP, sharing the same server platform. One SMS 20 designated as primary is active and handles all service orders. The SMS is also responsible for updating and synchronizing data in both SCPs.

We can provide a typical call scenario by assuming that a company, Access Corporation, is a subscriber of the virtual public dial plan service of the present invention. Access Corp. is making available to all its customers, a single telephone number that is easy to remember and dial. The virtual, public telephone number selected is equivalent to the alphabetical representation of their company name, ie. Access. The telephone number equivalent is thus 222377. This number is 'virtual' in the sense that it does not have a real physical address associated with the number. It is 'public' in the sense that it can be dialed by anyone anywhere in the telephone network. The area of coverage would of course be dependent on the subscriber requirements. That is, the subscriber can decide whether the number can be dialed from any local, national or international calling station. In this example, the real number of the terminating station used by Access Corporation to receive calls is 751-0823. Any calls made by dialing #access# will be routed to that station.

The number # sign, when used as a suffix indicates end of dialing. Although a timer can be used to indicate the end of dialing, it is preferable, if abbreviated digits are used to use an end of dialing suffix.

Figure 3:
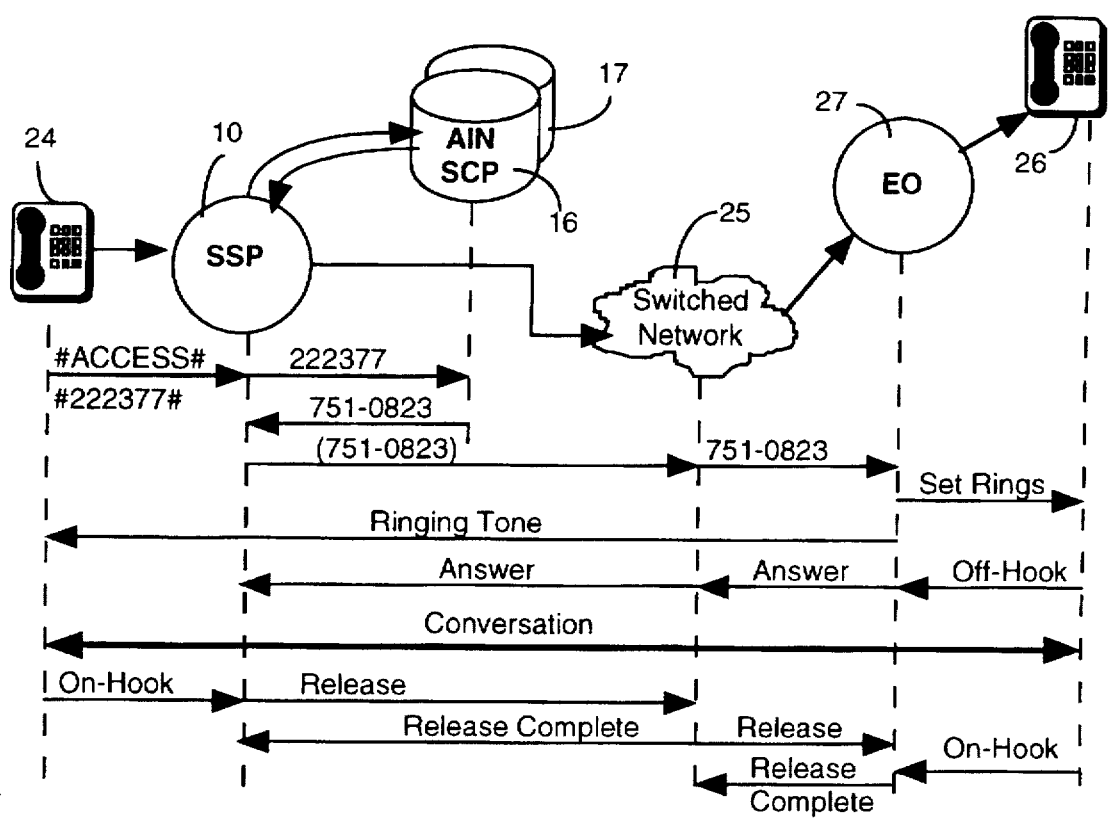
FIG. 3 is a flow diagram as a call progresses through the virtual public dial plan.

As illustrated with reference to FIGS. 2 and 3, after station 24 initiates a call by dialing #222377#, an AIN trigger in SSP 10 recognizes the # Access Code prefix forming part of the dialed digits. An SS7 message is formulated, containing the calling number, called number, and other data. This information is sent via the SS7 network 15 to one of two SCPs 16 or 17 operating in a load-sharing mode. The information is processed in the selected SCP, resulting in the real terminating number, i.e. 751-0823 and other data being sent back via SS7 to SSP 10. The SSP then uses received routing number to route the call through the switched network 25 to the terminating station 26. FIG. 3 shows a generic call flow for the system of FIG. 2. The end office (EO) 27 is shown to more accurately reflect the actual call flow.

Figure 4:
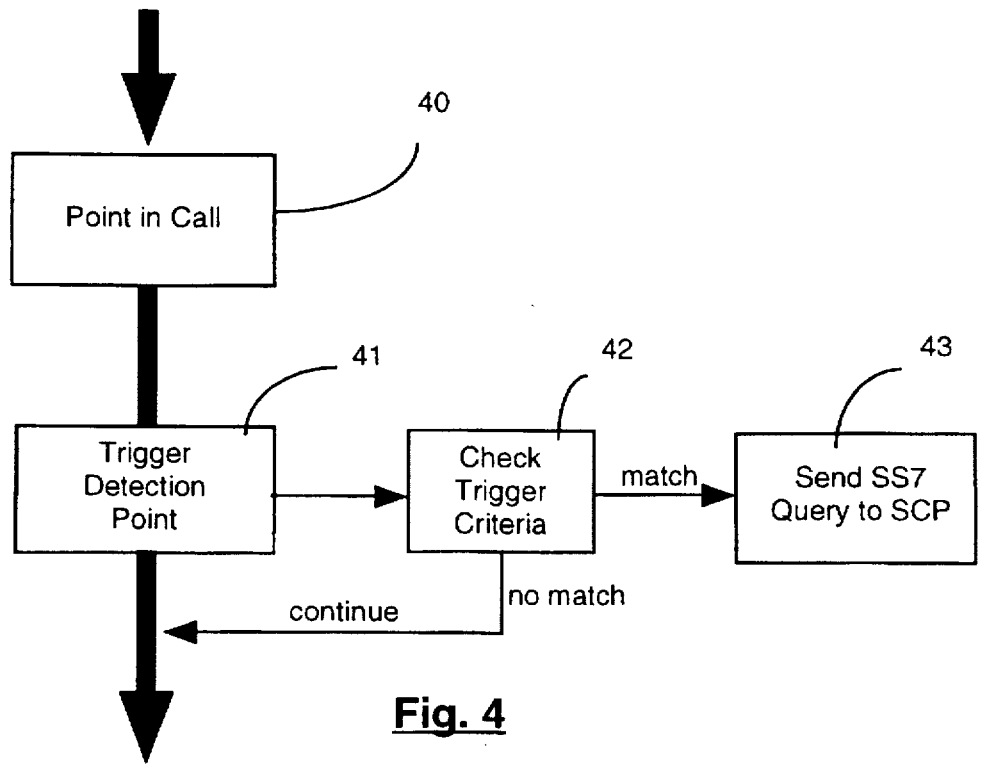
FIG. 4 is a diagram illustrating trigger detection as a call progresses.

As shown in FIG. 4, at a point in call 40, as the call progresses through the trigger check point 41, the criteria 42 for that trigger is checked. In FIG. 2, the trigger check point is SSP 10. The criteria 42, which can be established by a service order data fill, can include a specific line, trunk, dialed number, etc. The criteria 42 used with the VPDP is the VPDP access, i.e. the # sign. If a match is found for the criteria, a query is sent 43 to the SCP. If no match is found, the call continues to progress until another check point is encountered. The flow diagram of FIG. 4 is based on Bell Core's GR standards.

Triggers can be assigned through the standard service order process, giving operating companies with the capability to program the switch for access to service functions located at external databases.

Triggers for Advanced Intelligent Network (AIN) include subscriber or originating trigger (one that launches a query based on the callers phone number) and a dialed or office trigger (one that launches a query based on the dialed digits).

One trigger, known in AIN 0.1, as the Customized Dial Plan trigger allows special dialing options to a subscriber or a group of subscribers known as a customer group (for example, 4-digit dialing within the company or group). This subscriber trigger is based on the calling number, and any special routing or service features is a function of the caller. This trigger is not the most efficient method for implementation of a public virtual dial plan because treatment of the call in the SCP must key on the calling number and thus service instructions would have to be present on the SCP for all possible callers or customer groups rather than once for the dialed virtual address.

It is, however, recognized that through switch based translations, the customized dial plan trigger can create an environment giving the appearance of an office based trigger. All line subscribers, if they are not already, would be assigned to a customer group. The VPDP access code could then be assigned to each customer group and used to drive the calls towards a customized dial plan trigger.

Another trigger is, in AIN 0.0, the Dialed Number trigger, which generalizes an 800 function so that any dialed number could launch a query rather than just 800 numbers. The trigger number is loaded on a single switch and the number format must conform to the existing NANP. The trigger is invoked when a call to that DN number arrives at the Service Switching Point (SSP) where a query is then launched to the Service Control Point (SCP) for service handling. Use of this trigger is not practical for implementation of a flexible public virtual dial plan because adherence to the geographic routing plan is required. (The network must know to which exchange to route to based on area code and NXX exchange.)

A third trigger, which is used at SSP 10 to determine that the dialed number is in the VPDP, is the public office dial plan (PODP) or AIN future trigger equivalent, which is an office based trigger (query based on dialed digits but query launched from originating SSP). Because this trigger is loaded at the originating SSP, it is intended to be used by choosing ranges in the SSP for which queries are launched (it is generally understood that SCPs haven't the capacity to handle queries on all calls in an SSP). For instance, all 555-XXXX numbers could be sent to the SSP for treatment and thus the trigger is "Public". This methodology can also be utilized to route calls from offices with AIN capabilities to other offices with AIN capabilities prior to generating SS7 TCAP queries sent to the SCP database. In the form envisioned in the AIN standards groups, this trigger is not practical in providing a universal capability for a virtual dial plan because all dialed ranges would have to generate an SCP query. With this trigger type, used in conjunction with a special key as a prefix, the virtual dial plan can be explicitly chosen by the caller and thus a parallel virtual public dial plan can be achieved according to the methods described herein.

Another option is to provide a separate # AIN trigger which would be unique to this service. This trigger, which would be optional, would generate an AIN query which would be routed directly to an SCP. The call could be mapped to an AIN database following AIN standards or routed to any IN database with an appropriate response provided back to the SSP to allow routing of the call.

Up until now, it has been assumed that the network infrastructure used to provide access to the virtual public dial plan of the present invention, operates within the AIN standard. There are, however, instances wherein access to VPDP is requested from a switch which is not capable of supporting AIN requirements. In order to recognize that a call requires processing by AIN logic, Network Access Point (NAP) software is used at a non-AIN switch. Upon recognizing such a call, the non-AIN switch routes the call to an SSP or AIN Switching System (ASC) switch.

If a particular SSP or switch does not have # sign capability, it is proposed that the call using the # as dialed digits is directed to a # capable SSP and that the dialed digits, including the #, are passed in the ISUP message to the capable switch. The ISUP ANSI Standard (T1.113.3) does not allow for the # sign to be passed in the digits parameter. Unless the standard is altered to allow the # sign to be passed, the # sign must be converted to a unique digit string, ISUP digit, ISUP parameter or routed on a separate trunk group to an SSP capable of launching an AIN TCAP query to an AIN SCP.

Figure 5A:
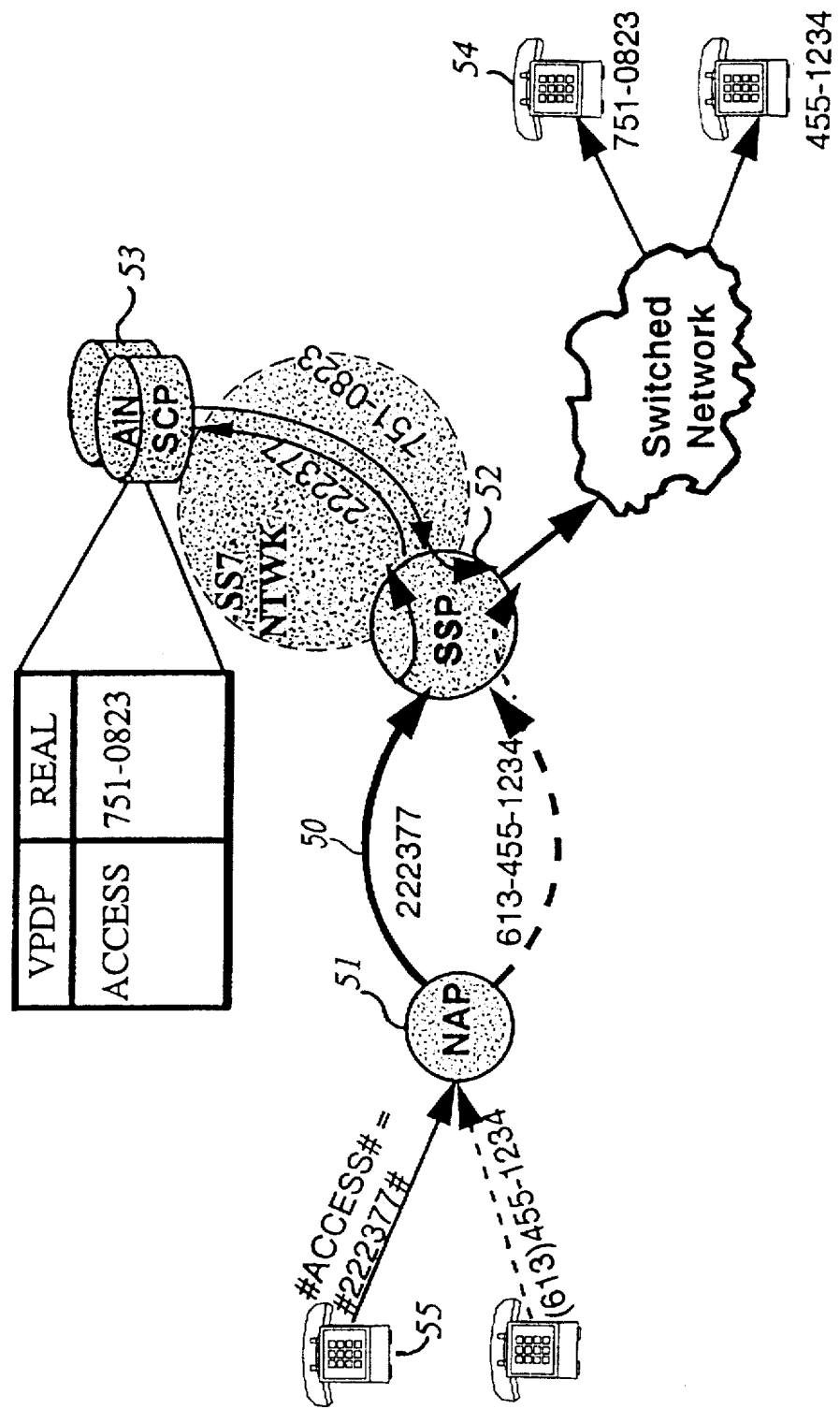
FIGS. 5a to 5d are block diagrams illustrating different options for routing of call from a non-AIN capable switch to an SSP.

The call scenario shown in FIG. 5a shows how a call originating from a non-AIN switch is routed to an SSP using a dedicated trunk. Whereas calls made on the NADP are routed as usual between switches, a call request to a VPDP number is routed via a dedicated trunk group 50. Since the # sign is not supported by NAP switch 51, it is truncated from the dialed digits before being sent to SSP 52. At the SSP 52, any calls received on this dedicated trunk automatically generates an AIN query which is routed to the AIN SCP 53. The response from the SCP 53 enables SSP 52 to route the call to the real terminating station 54, associated with the virtual number dialed at station 55.

Figure 5B:
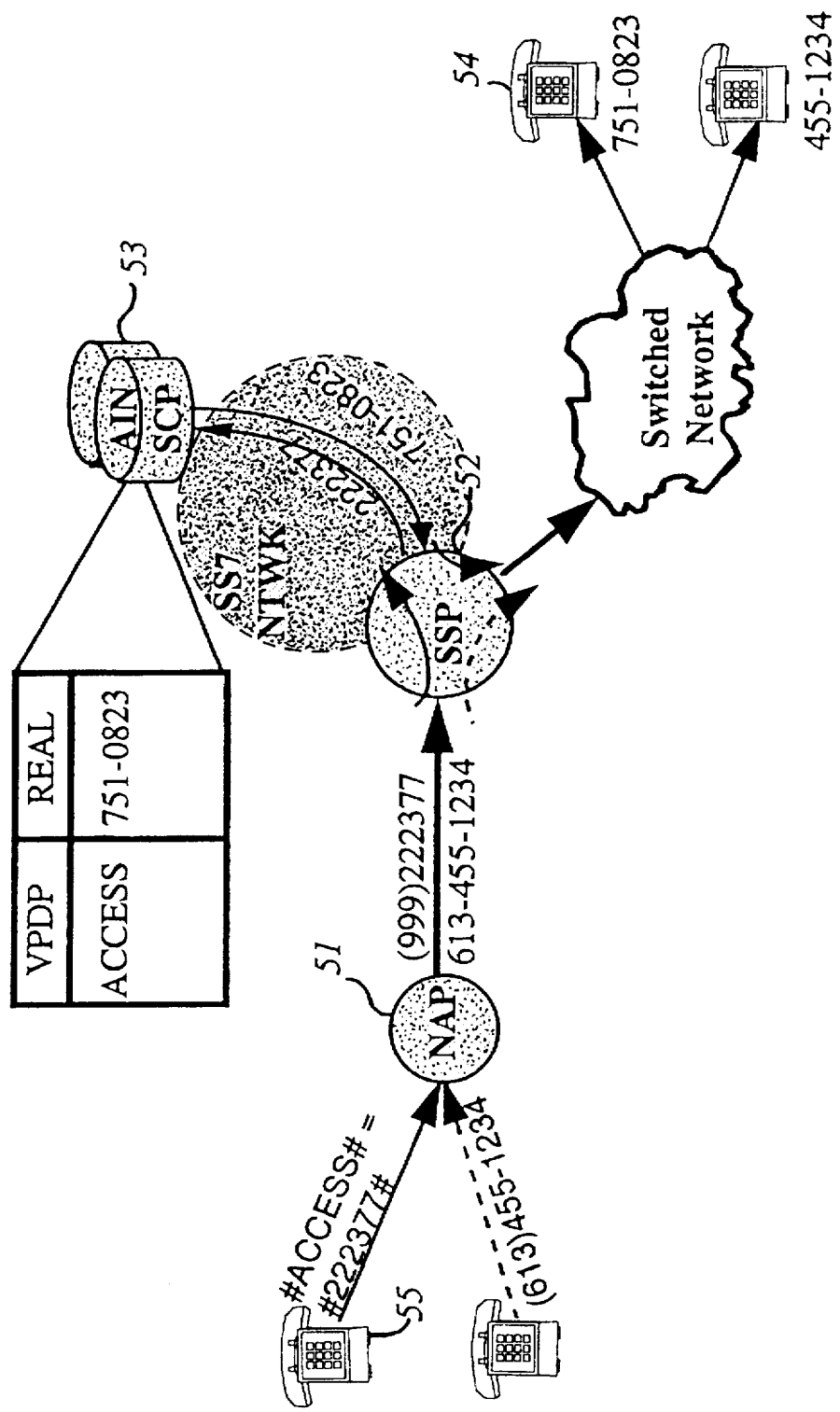

In FIG. 5b, the call scenario shown is from a non-AIN switch to an SSP by substituting the # sign in the ISUP message with a unique series of digits indicative that a VPDP call is being sent. In FIG. 5b, the series of digits 999 is used for that purpose. Thus, at the SSP 52, for any call received which contains as a prefix, digits 999, an AIN query is generated and automatically routed to the AIN SCP 53. The response from the SCP 53 enables SSP 52 to route the call to the real terminating station 54, associated with the virtual number dialed at station 55.

Figure 5C:
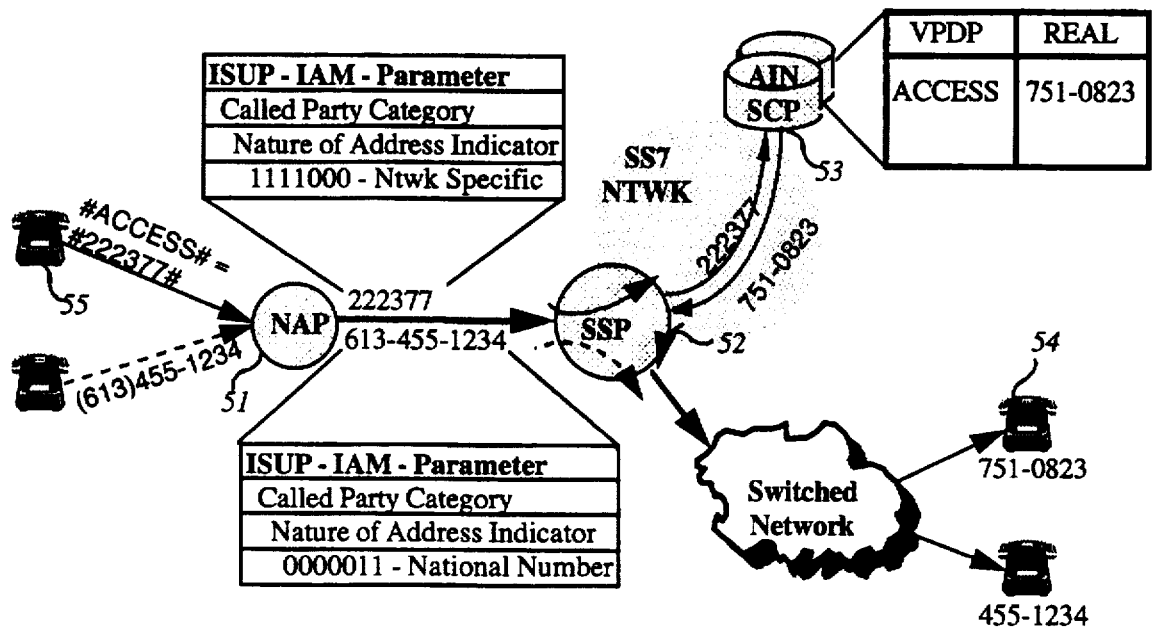

The call scenario shown in FIG. 5c, is from a non-AIN switch to an SSP. In this scenario, the # sign is substituted for a unique, unused, usually network specific or optional, ISUP parameter, indicating that a VPDP call is being sent. The prefix, ie. # sign, of the virtual number dialed by a caller at station 55 is converted at the NAP switch 51 to network specific ISUP IAM, Called Party Number, Address Signal, parameter 1110, spare— no interpretation. The remaining characters of the virtual number would appear in the ISUP, called party number, address signal, parameter. The ISUP message is then sent to SSP 52. When received, any ISUP message containing this network specific ISUP parameter would be sent to SCP 53 for translation.

Figure 5D:
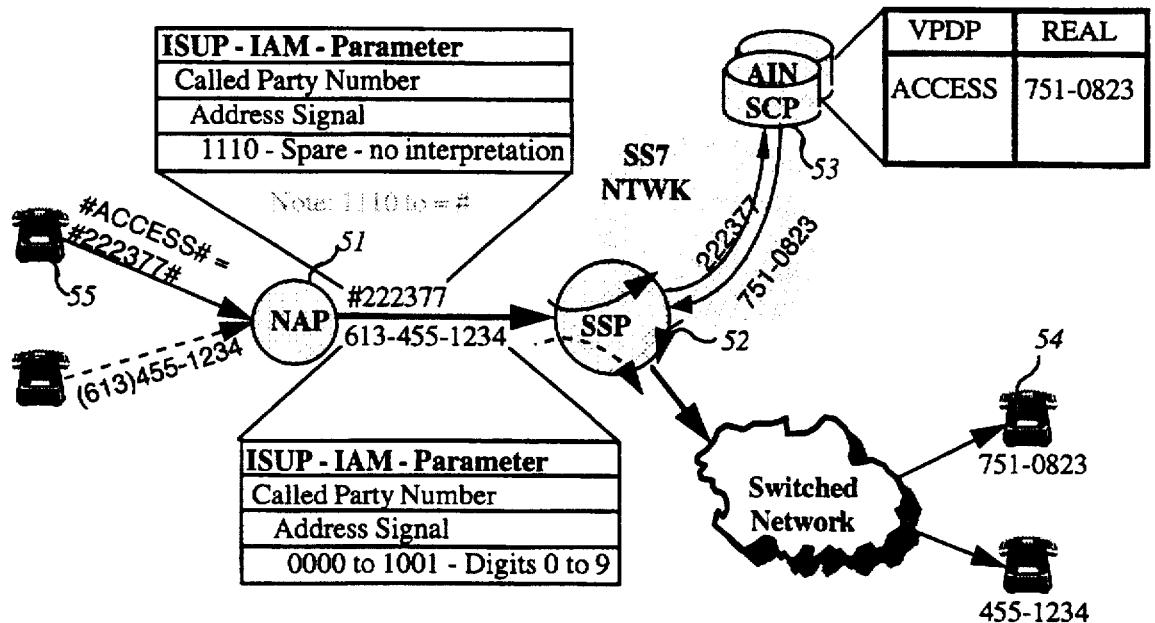
Figure 6:
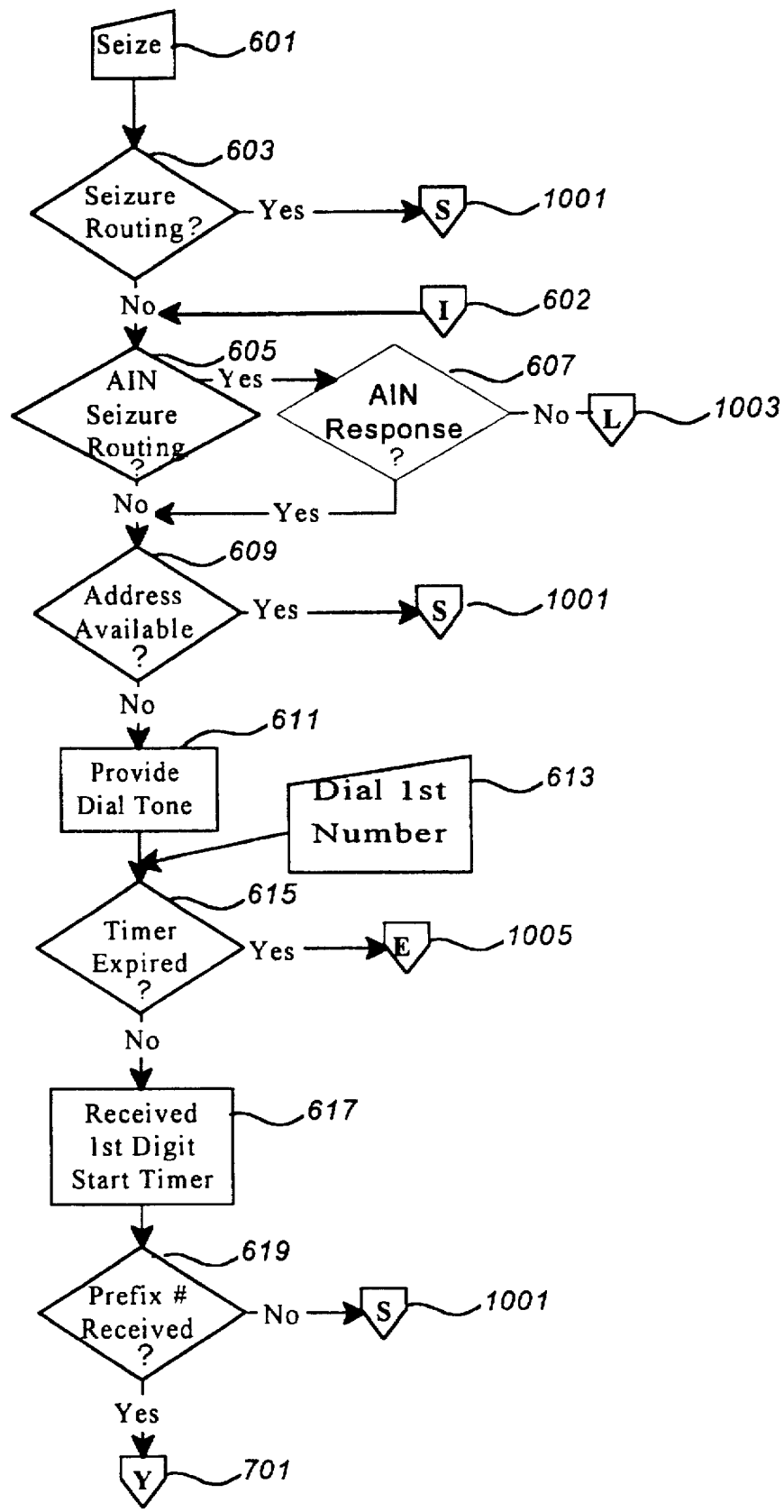
FIGS. 6 to 16 are flow diagrams illustrating how a call is routed according to the VPDP service of the present invention.

In FIG. 5d, the call scenario shown is made from a non-AIN switch to an SSP, by altering the ANSI Standard information (T1.113.3, Par. 3.6) expected in the ISUP message to include the # sign. At the NAP switch 51, the call is identified as a VPDP call and the # sign is converted to spare ISUP IAM, Called Party Number, Address Signal, parameter 1110, spare-no interpretation. The ISUP message is then sent to SSP 52. Once received at SSP 52, a TCAP query message is generated and forwarded to SCP 53 for translation.

As indicated previously, this method of routing a call to a number either on a virtual public dial plan or on an existing dial plan opens the possibility of a myriad of new services. One such service is a caller selected code access service, wherein a caller can select one of a number of available terminating device even though a single virtual number is used. For example, in the example illustrated above, Access Corporation has made available a public access number, i.e. #ACCESS# (222377). If, in association with their virtual public number, a code access service is provided, customers could call up a different terminating station, such as a fax machine, pager, cellular or voice mail by dialing an extra digit before the end of dialing # sign. For example, to reach Access Corporation's fax machine, a caller could dial #ACCESSF#, i.e. digit keys 222377 plus telephone key 3 associated with the letters DEF to provide an indication that the caller wishes to call the Fax machine. Similarly, dialing an extra digit (7) associated with the letter P indicates Pager access is requested, digit (2) with letter C for Cellular and digit (9) for letter V for Voice mail. Thus, if the number is used by a single individual, a caller could access any one of these devices by simultaneously dialing a single number followed by an extra digit associated with the requested device, without waiting for a interactive voice response unit. If the number dialed can be used to reach a number of individuals within, say the Access Corporation, the possibility exists of affixing an extra 2 or 3 digits indicative of an employee's initials, to reach that individual directly, again, without going through an automated attendant.

In each of the above examples, the extra digit would be used at the SCP to direct the call to a specific real number associated with a device or person to whom the call is directed. Thus, at the SCP, the look-up or translation table could have the following table.

| VPDP | No. Dialed | Station | Real No. |
| --- | --- | --- | --- |
| #ACCESS# | 222377 | (main) | 751-0823 |
| #ACCESSF# | 2223773 | (Fax) | 751-0855 |
| #ACCESSV# | 2223779 | (Voice Mail) | 751-8696 |
| #ACCESSJD# | 22237753 | (John Doe) | 751-1856 |
| #ACCESSMS# | 22237767 | (Mary Smith) | 751-1981 |

In operation, as indicated previously, the first step of the method consists in receiving at one of the digital switching points a number called. Then, a test is performed to verify whether the number received in the first step is a number of the virtual public dial plan, and if the number received is a number of the virtual public dial plan, the following steps are performed:

i) forming with the number received in the first step a virtual public address of predetermined length;

ii) supplying the virtual public address of step (i) to the database system to determine a corresponding network node address; and iii) supplying the corresponding network node address to the digital switching point of step (a), and routing the call through the network infrastructure according to the existing dial plan; or else:

routing the call through the network infrastructure according to the existing dial plan and the number called.

More particularly, the test of verifying the number received after its reception consists in verifying whether the number received in the first step is preceded by a VPDP Access Code. In a preferable way, the VPDP Access Code is a character that is not used in the NANP, such as the pound sign of a telephone keypad. Of course, combinations of two or several characters representing a VPDP Access Code are also possible, but # is the most suitable VPDP Access Code for the NANP.

The step (i) more particularly consists in forming a virtual public address in a unique 10 digits number that is not a valid 10 digits number in the existing dial plan.

The step (iii) may further comprise steps of verifying whether a code access is selected, and if a code access is selected, adding the selected code access to the virtual public address at a predetermined position. As shown above, the code access is a service whereby a caller can reach a subscriber by dialing its virtual public number in the virtual public dial plan and appending a code to the end of the dialing sequence, which would allow differentiation for example of a home number, a car number, a fax number, a modem number, a pager number or an office number. For example, a caller dialing #6135861314F, which is a virtual public number, would reach the fax machine of the subscriber with the virtual public number of 6135861314. For this service, the subscriber would be allowed to customize his/her code access.

FIGS. 6 to 18 are flow diagrams illustrating the method steps for routing a call to a number corresponding to either a virtual public dial plan or to an existing dial plan through an existing telephone network infrastructure. These steps consist of detecting when a caller lifts handset, which provides a seizure indication 601 to the digital switching point SSP 10 in FIG. 1. From this seizure indication 601, a verification 603 of whether the seizure indication is present or not, and if it is present, it directs the call to a predetermined number and enters an S condition 1001, leaving the caller without an opportunity to input a number. If the seizure indication is not present, an AIN seizure routing verification 605 based on line information is performed. If routing information is not passed back to the SSP, which corresponds to a negative answer 607, a L condition 1003 is entered, otherwise the routing information is passed back to the SSP and a subsequent verification is performed. This subsequent verification consists in verifying whether an address is available 609. If the ISCP returns a routing address, the call will default straight to the S condition 1001, shown on FIG. 10, otherwise, a dial tone will be provided 611. As well known in the art, the dial tone is used to give an audible indication to the caller to start inputting the number to be reached.

As the dial tone is activated, a first digit timer associated with the receipt of a first digit is started 615. If the caller dials 613 a first digit before the first digit timer has expired, the first digit timer will be stopped and an inter digital timer started 617. This inter digital timer will be restarted between each digit. If the caller did not dial a first digit within the allowed period of time, an E condition 1005 is entered. Usually, the inter digital timer is shorter than the first digit timer.

From the moment a first digit is dialed 613, a test 619 is applied onto it to verify whether the digit dialed is the #. When the first digit received at the SSP is #, the call will be directed to a condition Y 701, shown on FIG. 7, otherwise, the dialed digits will be routed using existing dial plan, as described by condition S 1001.

Figure 7:
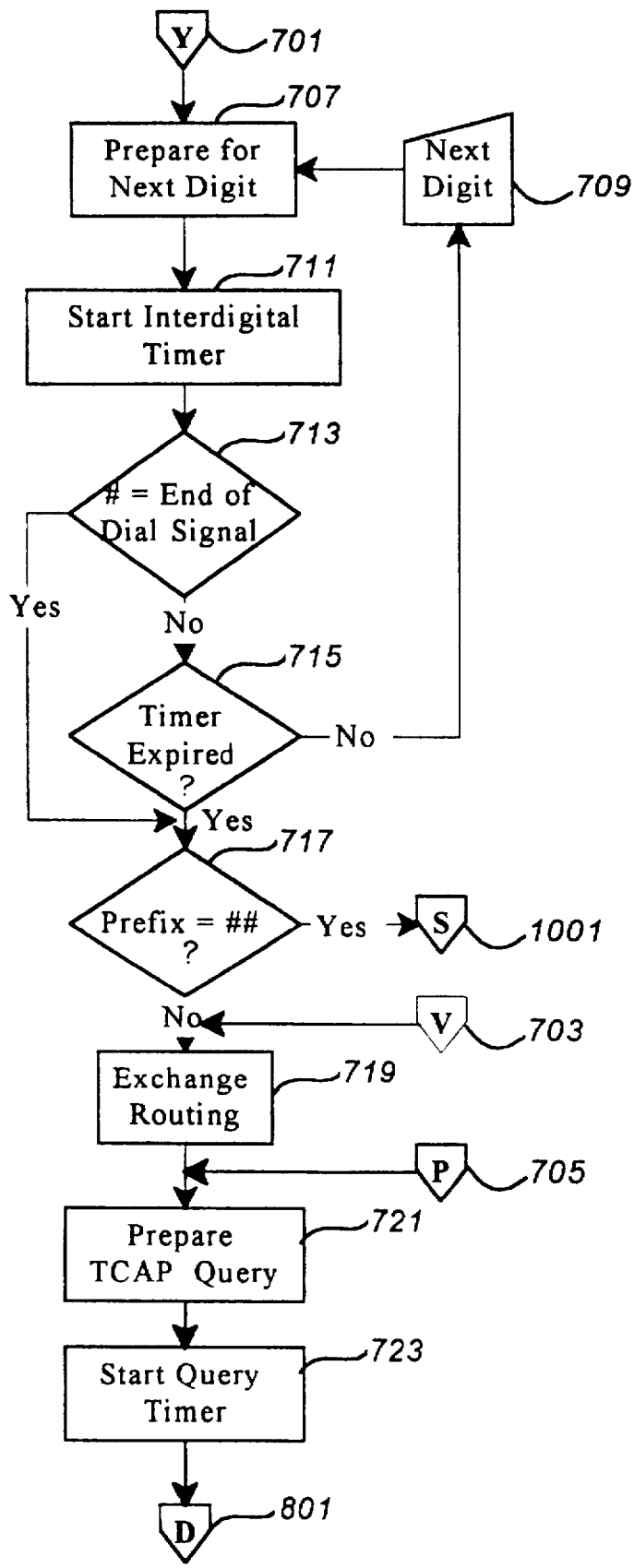

As shown on FIG. 7, the next step, when the first dialed digit is # is to prepare 707 for the next digit. The inter digital timer will be started 711, while waiting for the next digit in the sequence. If the second digit is not received, the call will still be allowed to proceed, providing other options for continued routing exist. If a next digit is dialed 709 before the inter digital timer has expired 715, the inter digital timer is reset and a next digit is awaited. Another test for the verification of the digits dialed could also be provided. This test would consist of verifying whether an end of digits indicator has been pressed 713. The presence of such an indicator could allow SSP software to bypass the wait state associated with the inter digital timer for the dialing sequence.

Once either the inter digital timer has expired or an end of digits indicator has been pressed, an additional verification could be performed for recognizing and isolating "##" calls 717 which are utilized by certain vendors for last number redial, so that they would not be treated as virtual public numbers. Upon detection of "##", the call could be routed using standard translations of the existing dial plan, S condition 1001, or be forwarded to the AIN SCP for recall determination.

Once all the previous verifications have been performed for identifying virtual public numbers, # drives the call toward an AIN PODP trigger using telephone exchange translations, this step being called exchange routing 719 on the flow diagram. Prior to the AIN PODP trigger detection point, # is deleted such that only the NANP dial plan information is used for the AIN PODP trigger. The # could also be incorporated in the TCAP query message.

The further step consists in preparing a TCAP query 721. This TCAP query may include for example CLID, dialed digits, and other information. Once the TCAP query has been generated, a timer is required to assess the ISCP responsiveness, so a query timer is started 723. Contingency options may be put in place where a response is not returned from the AIN SCP within the expected period.

Figure 8:
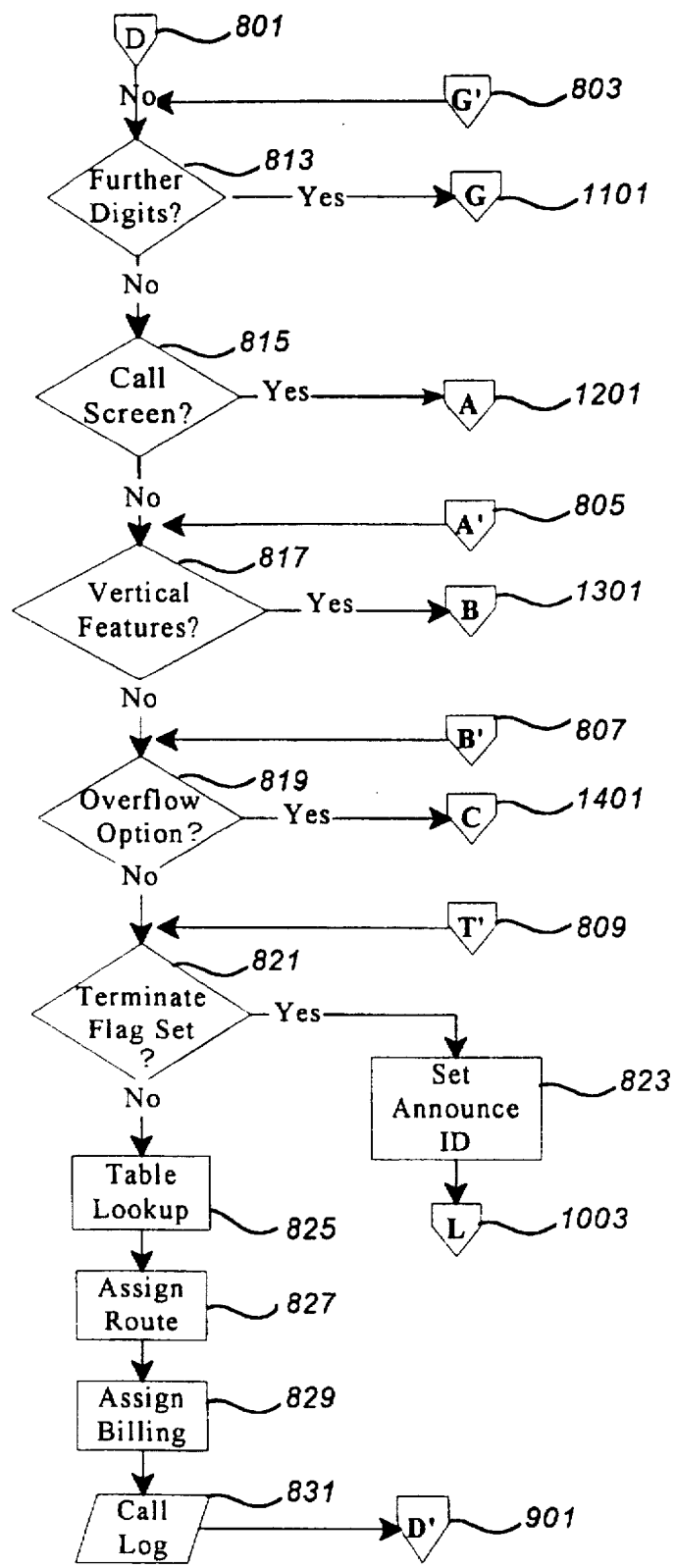

Then a routine to allow for inputting of a code access is generated, as shown on FIG. 8 condition D 801. This is the entry point where the TCAP query arrives at the SCP. The key field which contains a representation of the dialed digits points to the custom service logic to be executed for the owner of the service.

For some features, it will be necessary to prompt the caller for additional digits. If those features apply to this call, the SCP will respond to the SSP with a control message indicating an announcement to play and a number of digits to collect, represented on the diagram of FIG. 8 by "Further digits?" 813. If further digits are required, condition G 1101 is entered and the corresponding steps shown on FIG. 11 will be performed. Condition G 1101 causes SSP to generate a TCAP with the additional digits requested.

Figure 12:
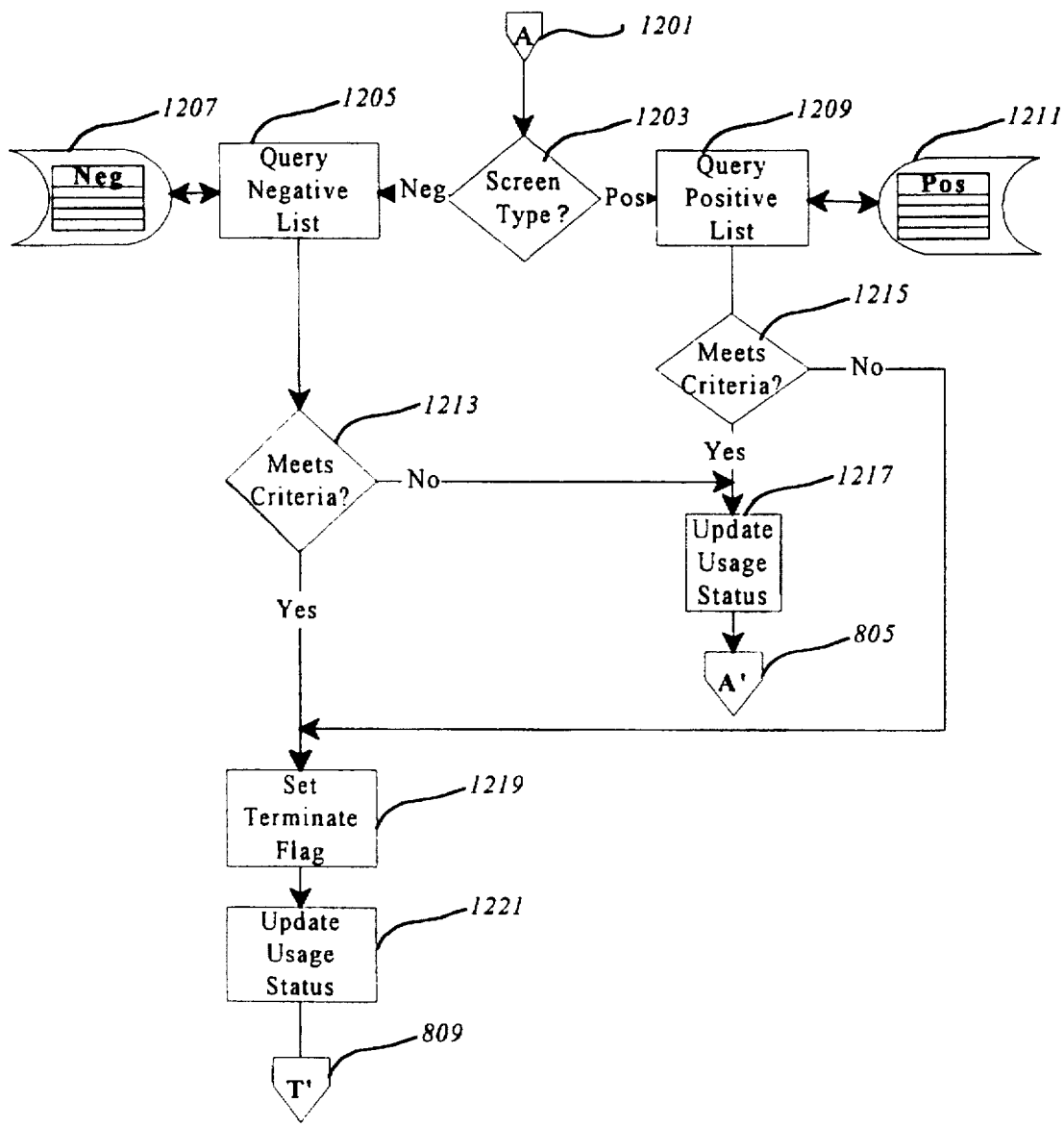

The method may include verifying for a positive or negative call screening features 815, positive implying that the subscriber provides a list of allowable callers, and negative implies that the subscriber provides a list of callers not to be accepted. If a call screening feature 815 is present, an A condition 1201 shown on FIG. 12 is entered. The A condition 1201 performs the call screening logic according to the subscriber features.

Figure 13:
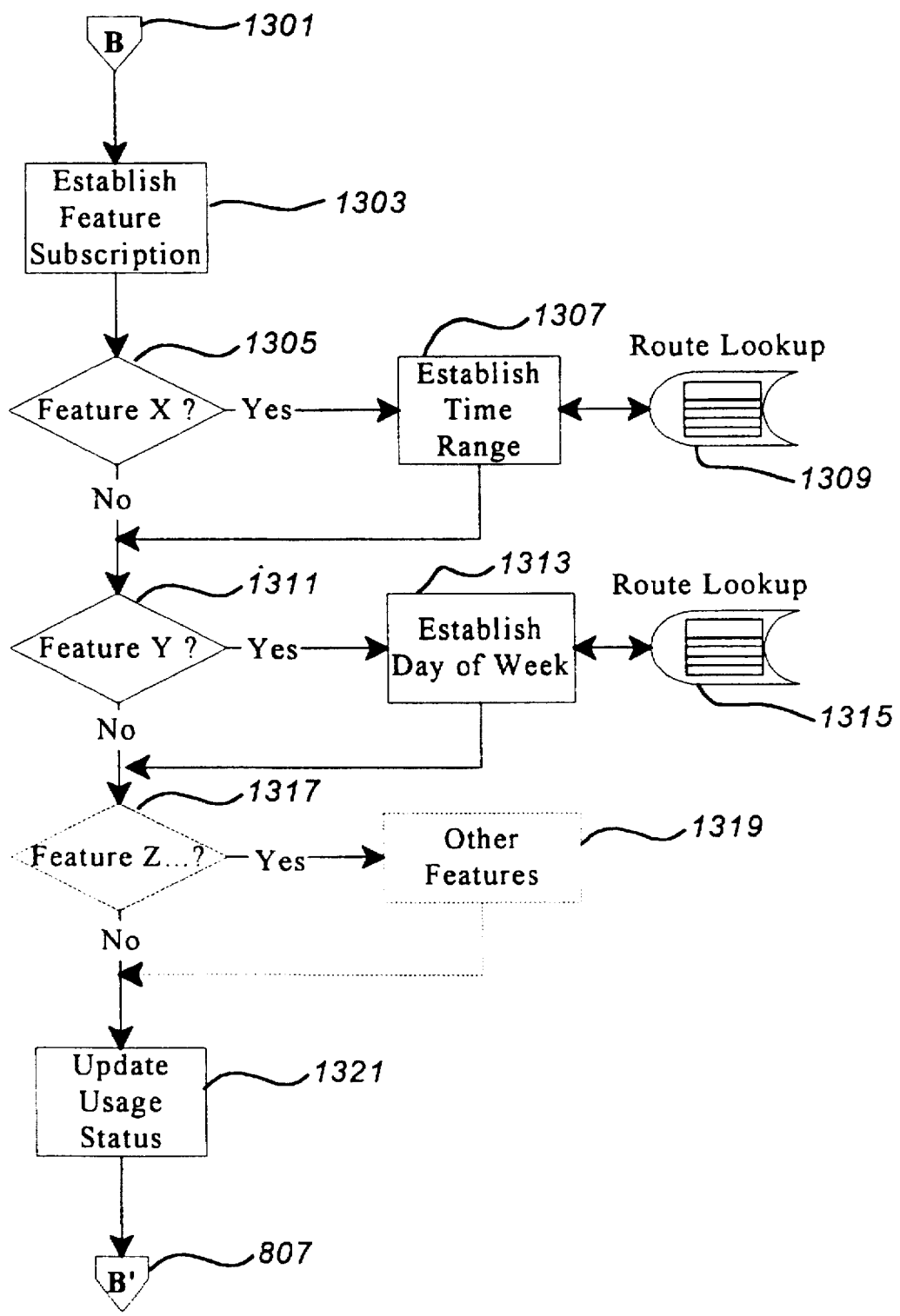

The method may further include verifying for vertical features 817 such as time-of-day, day-of-week etc. If such options are present, a condition B 1301 shown on FIG. 13 is entered and additional steps accordingly will be required. The B condition 1301 performs any additional service feature functionality prior to routing the call.

Figure 14:
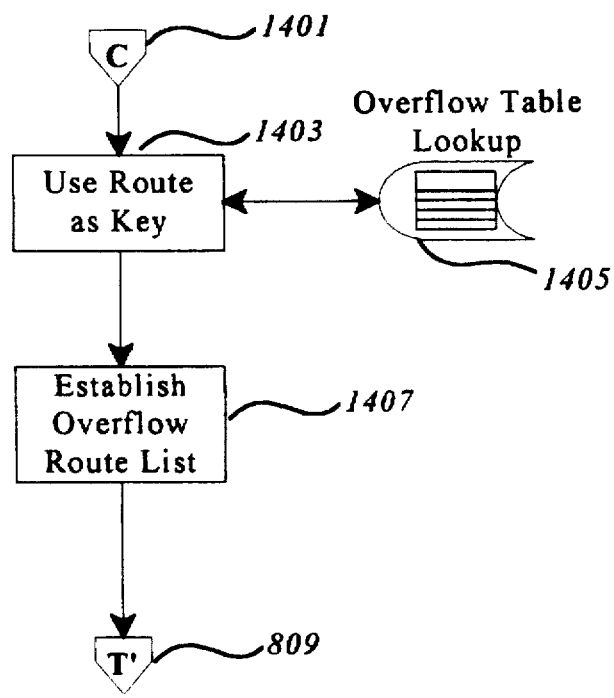

The method may also further verify if the customer has subscribed to overflow routing options 819 whereas additional addresses could be requested in the table lookup. If so, a condition C 1401 is entered and the steps shown on FIG. 14 are performed. The C condition 1401 performs any logic associated with overflow routing having established relationship to vertical features.

Figure 10:
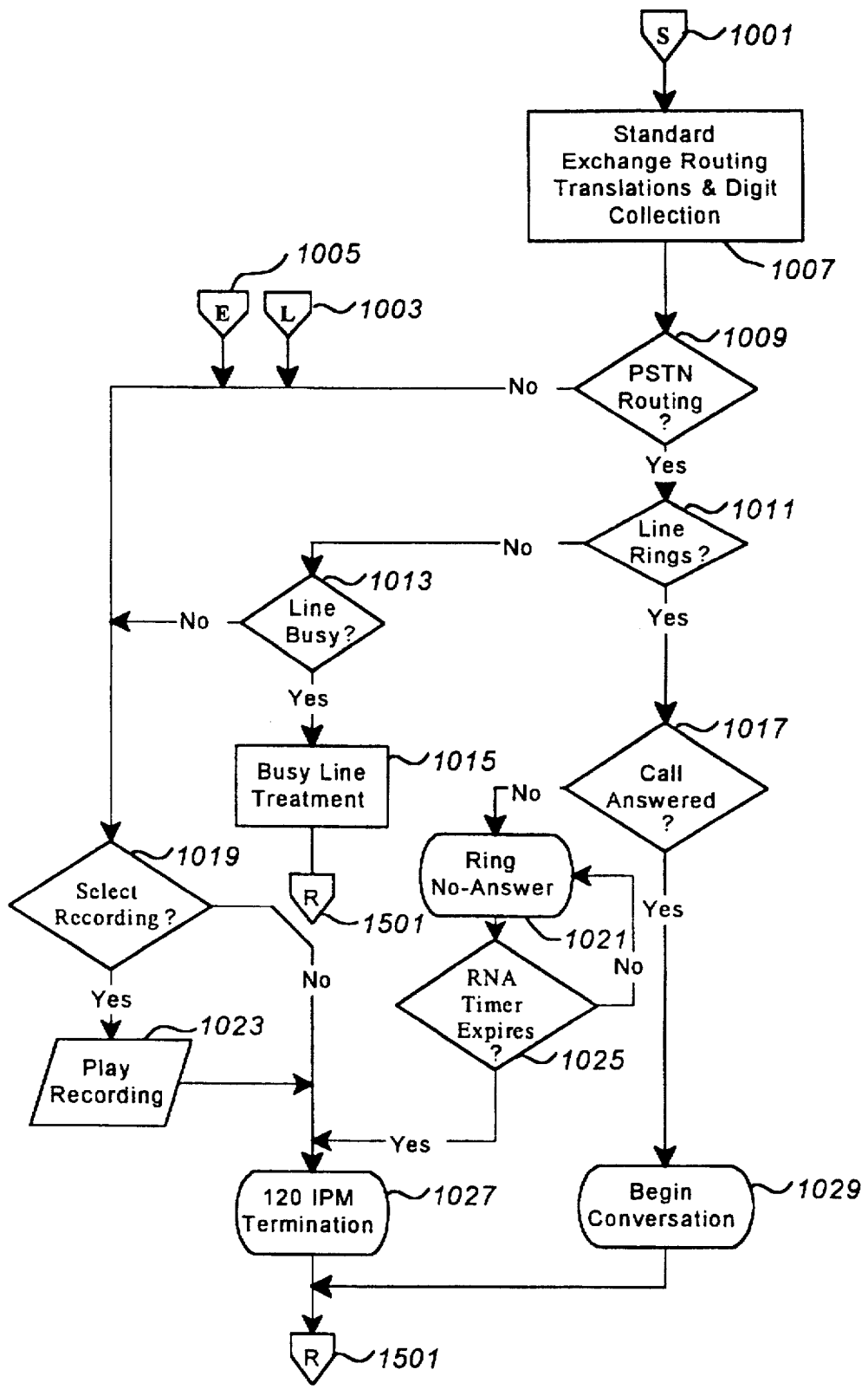

The method could also allow verifying of whether or not a terminate flag set has been encountered 821. If so, an announcement is selected 823 and a condition L 1003, shown on FIG. 10, is entered. When no terminate flag set has been encountered, the method pursues with the final routing number determination based on all of the options. It is to be clearly understood that more options could be offered, and the order in which they are offered does not affect the end result.

Once the call variables have been established, the routing response message can be built, which may include any combination of allowed AIN call parameters including a termination request. Therefor, the next step consists in looking up in a table 825, based on any combination of the above mentioned features for determining a corresponding network node address, also called route. Then, the route, is assigned 827, by building the routing response which may include any combination of allowed AIN call parameters including a termination request.

A next step could consist in assigning the corresponding billing parameters 829. The billing parameters returned could uniquely identify the features utilized throughout the call execution on the SCP so that the billing record generated at the SSP represent the pertinent rated aspects of the call.

Another step could also be performed before returning the call to the SSP. This last step would consist of internally sampling the call on the SCP in some or all cases to enable customer report generation for marketing or engineering purposes. Log data 831 could be on a per call basis or a statistical cross-section and may include operational measurements, peg counts, caller statistics, screened attempts, call distribution, fraud attempts or any call variable or system variable pertinent to understanding aspects of the call distribution and service use. After these steps, the call enters in a condition D' 901, shown on FIG. 9, where it is returned to the SSP.

Figure 9:
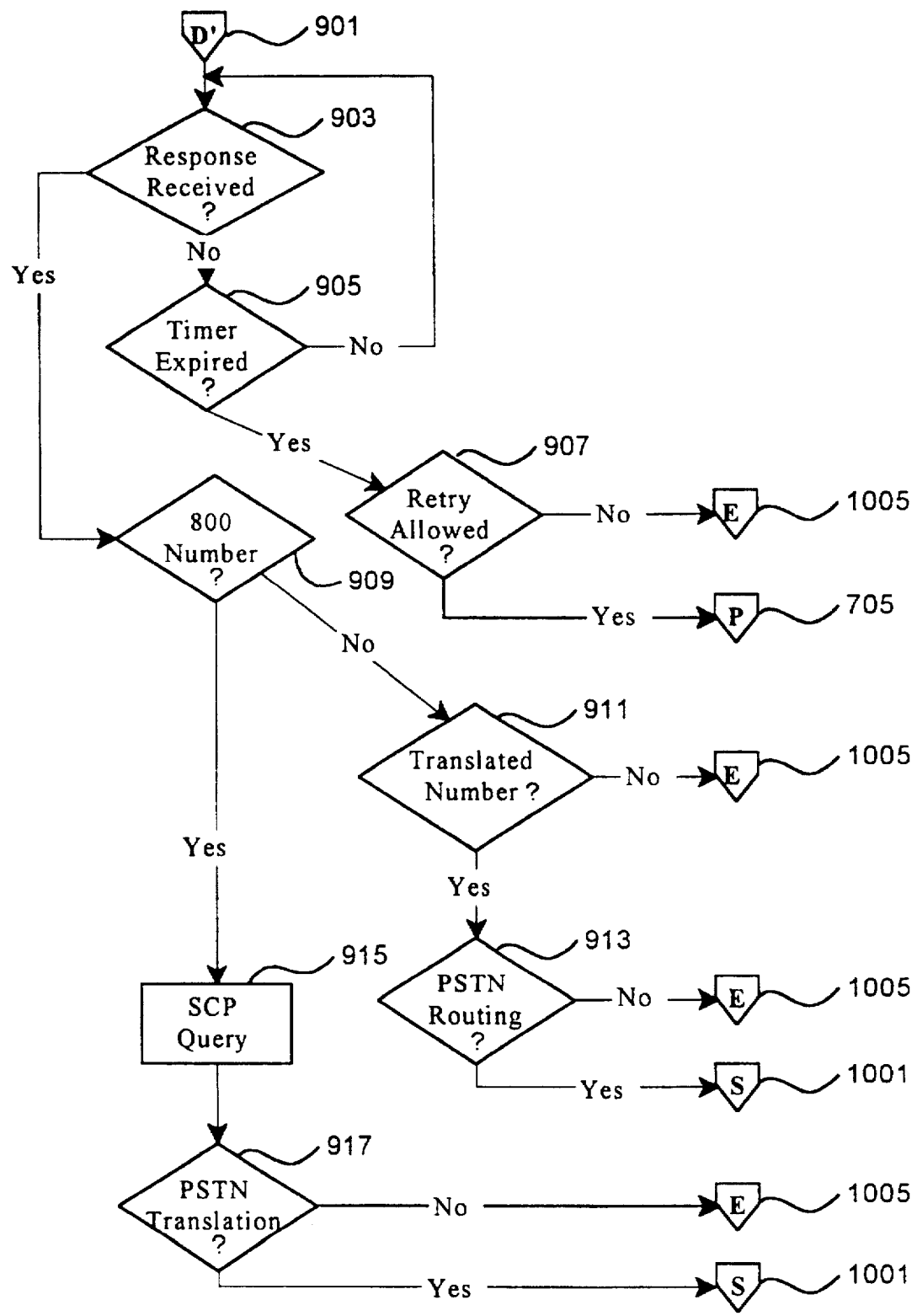

Referring now to FIG. 9, there is shown the steps performed when in the D' condition 901. The first step in condition D' 901 consists in verifying 903 whether a response from the AIN SCP has been received at the SSP. If not, a timer 905 will be set. The timer sequence continues to cycle until either the timer expires, a conversation is initiated by the ISCP or a response is returned. When a response is returned prior to expiration of the timer, a number for which the SSP is capable of routing should be returned. Routing can take the form of PSTN routing or treatment for error conditions. However, if the timer comes to expiration and a response has not been received, a verification is performed for verifying whether a retry is allowed 907 or not. If a retry is allowed, a P condition 705 is entered, if not, an E condition 1005 is entered. Generally, the SS7 TCAP protocol allows for one retry attempt to the AIN SCP per transaction. Where a second AIN SCP is available, the retry will be redirected. If however, the second query attempt is also unsuccessful, the call will be sent to a failure treatment (set terminate flag).

When a response has been received, a verification is made to the response obtained to verify if it is a standard PSTN number or a Special Access Code (SAC) (e.g. 800,900,600 etc.) number 909. If the response is a SAC number 909, the call will be routed using existing SAC flows. Then, since most calls route to access exchanges with an SCP database attached, the call will be routed as an SCP query 915, and then a verification will be performed to verify that the result of this SCP query 915 is a standard PSTN translation 917. If it is a standard PSTN translation, the S condition 1001 will be entered, otherwise, the E condition 1005 will be entered. If the response is not a SAC number, a verification 911 is made to make sure that the response returned by the AIN SCP is a translated number, which means number returned by the AIN SCP for continued network routing. If it is, a last verification 913 is made to ensure that it corresponds to the PSTN routing and if it does an S condition 1001 is entered, and if not, an E condition 1005 is entered.

Referring to FIG. 10, there is described the steps performed when in the S condition 1001 mentioned before. This condition describes the translations used to complete the call, at the terminating office, once the routing has been determined and verified. First, the call is routed by standard switch routing translations 1007. Then, a verification of the PSTN routing 1009 is performed. If the PSTN routing is adequate, a verification is made to ensure that the line rings 1011. Once the line rings, the call can either be answered or disconnected without an answer. If the line does not ring, a verification is performed to see if the line is busy 1013. If it is, a busy line treatment 1015 is generated, a 60 impulse per minute is activated and a condition R 1501 is entered.

If the call cannot be completed to the destination, a call treatment shall be supplied. This treatment could be invoked by the network or directed by the AIN SCP. This treatment, which corresponds to conditions E 1005 L 1003, could comprise the following steps:

selecting a recording 1019, the recording can be selected as a parameter in the TCAP response, or via standard translations;
  if a recording has been selected, playing the recording 1023, followed by a 120 interruption per minute termination tone 1027 and entering in the R condition 1501;
  if a recording has not been selected, the call routes directly to the abnormal treatment condition, 120 (IMP) interruptions per minute, tone 1027

On the other hand, when the call has been routed and the line rings, a verification is performed to ensure that even if the call is not answered the line will not keep ringing for an indefinite period of time. Thus, if the call is answered 1017, the conversation is allowed to begin 1029, until the call enters in the R condition 1501. However, if the call is not answered, a ring no answer timer 1021 is started and if the call is not answered in the meantime, the 120 interruption per minute tone 1027 will follow and the call will enter in the R condition 1501.

Figure 11:
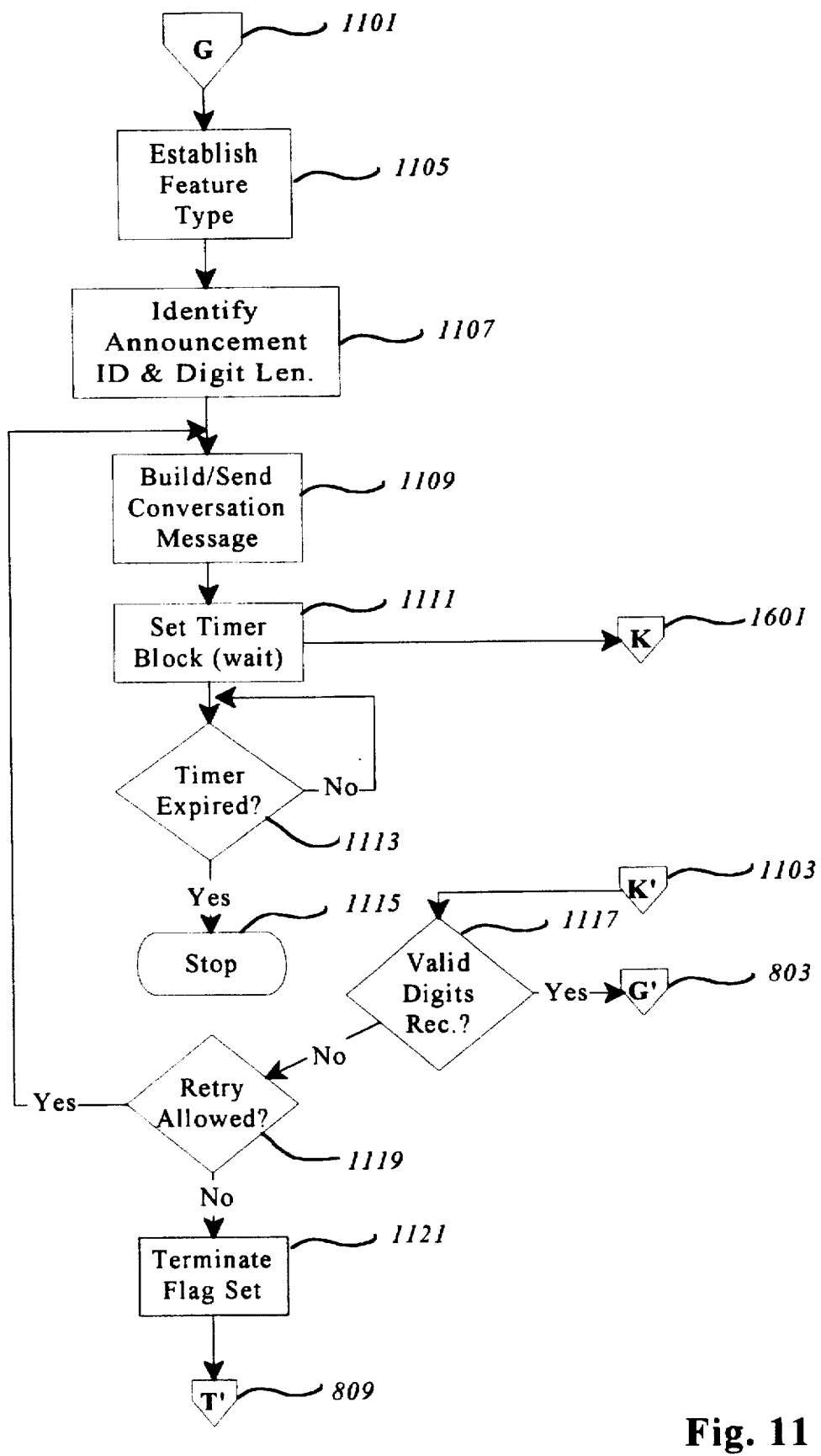

Referring now to FIG. 11, there is shown the steps performed when the G condition 1101 is entered. This condition is entered when a virtual public number has been dialed, and that additional digits are required, such as for the code access. This condition makes a request to the SSP to prompt and collect digits. The first step of this condition consists in establishing the feature type 1105, which is a function of unique feature set of the subscriber. In fact, certain features could even require collection of several additional digits.

The next step would consist in identifying announcement, identification and digit length 1107, where the feature type indicates the voice announcement and the number of digits to be collected. For example, special routing options outside of the initial dialed code could be required for personal identification number validation for screening or priority routing. Then, a conversation TCAP message would be built and sent 1109 using announcement identification and digit length 1107. Multiple attempts may be allowed if invalid entries are given. A timer 1111 will be set for forcing a response within a prescribed time, otherwise the call will terminate with failure treatment. After sending the control message to the SSP to prompt and collect one or several more digits, which corresponds to a K condition 1601, the timer synchronously ticks. If the timer expires 1113 prior to getting response, then the call terminates 1115.

If while the timer 1111 was ticking, a response is obtained, a K' condition 1103 is entered. Then, a verification on the validity of the digits is performed 1117. If the digits are valid, a G' condition 803 described on FIG. 8 is entered. This G' condition 803 returns into the flow diagram of FIG. 8 and generates a TCAP conversation to request additional digits from the caller. But, if improper digits were entered, a retry counter 1119 will manage the number of attempts allowed. Once the maximum number of attempts is exceeded, the call is terminated by setting the terminate flag 1121 and entering a T' condition 809 described on FIG. 8.

Referring now to FIG. 12, there is shown the steps performed when entering in the A condition 1201, which is when a virtual public number has been dialed and the customer has subscribed to call screening features. The first step consists in verifying which screening type 1203 was selected by the subscriber. If a negative screening type was selected, a negative list query 1205 is made. The negative list 1207 is maintained and holds line identification of callers not authorized to connect to subscriber. Then, if the criteria is met 1213, the calling party is not authorized to call the subscriber and the call is terminated by setting the terminate flag 1219, updating the usage status 1221 and entering the T' condition 809. As mentioned before, the terminate flag will indicate that the call should be terminated without feature processing. If the call does not meet the criteria 1213, an update usage status 1217 is made and the condition A' 805 is entered.

If a positive screening type was selected by the subscriber, a positive list query 1209 is made. The positive list 1211 is maintained and holds line identification of callers authorized to connect to the subscriber. Then, if the criteria is met 1215, the update usage status 1217 is made and the A' condition 805 is entered. If the criteria 1215 is not met, the caller is not authorized to call the subscriber and the terminate flag 1219 is set, the appropriate usage status 1221 is updated and the T' condition 809 is entered. The usage status flag is a running tally of the chargeable features or options that have been consumed during the call. It will be used to pass the appropriate billing information back to the SSP where a record can be generated. This and other usage information can be logged on the SCP or a peripheral for billing or reporting purposes.

Referring now to FIG. 13, there is described the steps performed in the B condition 1301, which is entered when a virtual public number has been dialed and the subscriber has selected vertical features. The first step consist in establishing the feature subscription 1303. The SCP would maintain a feature list of those features subscribed to by the subscriber. The features would not necessarily be mutually exclusive and interaction between vertical features could exist, even though not shown on this flow diagram.

The next steps would consist of determining which features X, Y, Z, etc. are subscribed 1305, 1311, 1317 and 1319. An example of a vertical feature is time of day routing. In this case, the subscriber could have any code destinations route to alternate addresses depending on the time of the day. Time ranges would exist and subscribers would provision a schedule for each code and the associated routing address. If, for example, X or Y has been selected, a second verification would be performed to verify if the call is within the established range 1307 and 1313 by referring to corresponding tables 1309 and 1315. Thus, the subscribers features would be executed and when complete, the output would be a routing number for that particular call, as well as any usage or billing status updates as a result of feature consumption. Then, an update usage status 1321 would be performed and a condition B' 807, shown on FIG. 8, would be entered. The usage status flag is a running tally of the chargeable features or options that have been consumed during the call. It would be used to pass the appropriate billing information back to the SSP where a record can be generated. This and other usage information can be logged on the SCP or a peripheral for billing or reporting purposes in addition to any record generation in the PSTN.

Referring now to FIG. 14, there is shown the steps performed when the condition C 1401 is entered. This condition is entered when a virtual public number has been identified and when the subscriber has selected overflow routing option. Then, an overflow table lookup 1405 is provisioned to contain numerous overflow routing addresses or trunks for overflow routing by the SSP. The first step consists in using the route number as a key 1403 to obtain the list of overflow routes or trunks from the on-line database residing on the SCP or adjunct of the overflow lookup table 1405. From this lookup, an overflow route list is established 1407 and the T' condition 809 is entered.

Figure 15:
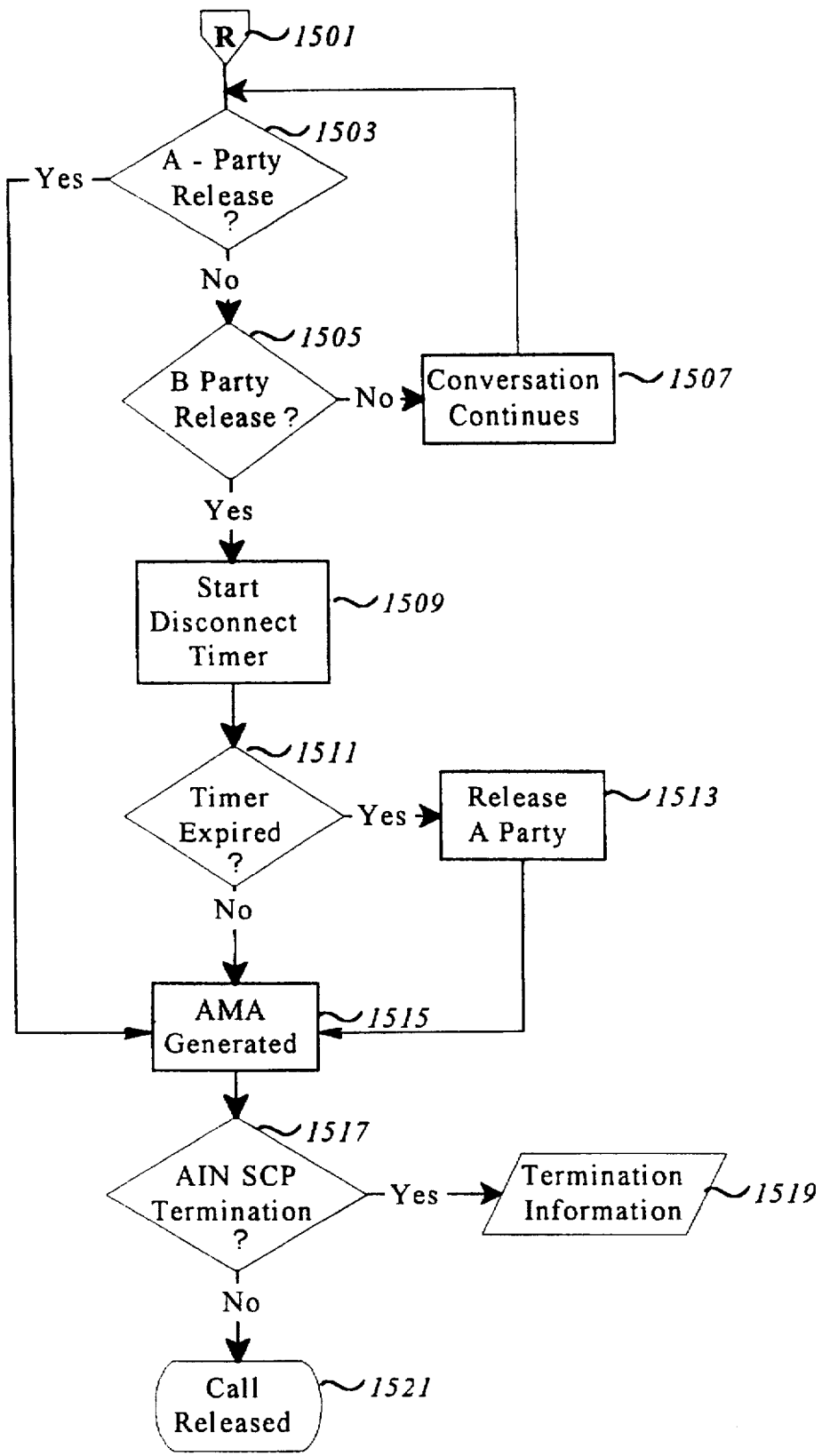

Referring now to FIG. 15, there is shown the steps performed when the R condition 1501 is entered. This condition describes the steps performed for realizing standard call release sequence. This procedure is identical to the disconnect of any other type of call. The only deviation is where notification is required by the AIN SCP. The first step consists of verifying whether A party releases call 1503, and if not, verifying whether a B party releases the call 1505 and if not, the conversation continues 1507. If the B part releases the call first, disconnect timer is started 1509. Once the disconnect timer expires 1511, the A party is released 1513 and an Automatic Message Accounting is generated 1515. When the A party releases the call first, the Automatic Message Accounting is generated 1515. This message is useful for billing information and billing parameters are contained in the TCAP response message. After the Automatic Message Accounting 1515, if notification to the AIN SCP of call termination is required 1517, a termination information are sent 1519, otherwise the call is released 1521. Under certain conditions, it is sometimes necessary to provide notification to the AIN SCP of call termination. A TCAP termination message is then generated. Although the SSP controls the generation of this TCAP message, it is usually directed by the AIN SCP during conversation or with response.

Figure 16:
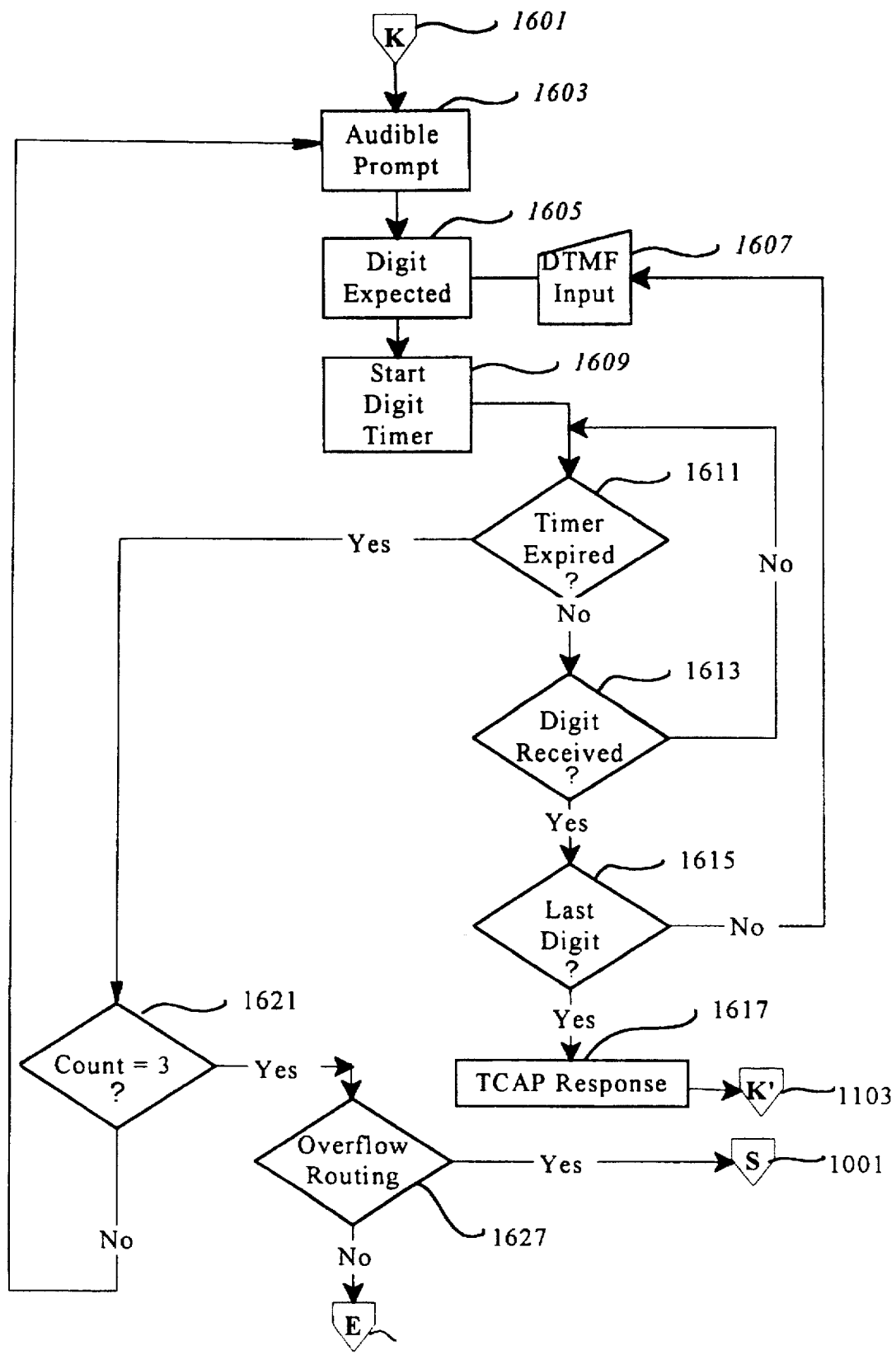

Referring now to FIG. 16, there is shown the steps performed when the K condition 1601 is entered. The first step consists in generating an audible prompt 1603 to indicate to the caller that more digits must be provided. Then service exchange attaches tone detection equipment on the circuit waiting for DTMF input from the caller 1607. When the caller inputs the digit expected 1605, a start digit timer 1609 is started. If the start digit timer is not expired 1611 and the digit 1613 has not been received, the call stays in a loop. Until a digit is received, the call will continuously check the timer status 1611 to determine if the timer has expired. When in that loop, from the moment a digit is received 1613, a verification 1615 as to whether the digit received is the last is performed. If it is not the last digit, the call returns to the digit expected 1605. The request for further digits from the AIN SCP indicates the number of digits to expect. Until the last digit has been received, the service exchange waits for the next digit. Once the final digit is confirmed, a TCAP response 1617 is generated and a K' condition 1103 is entered where the digits are forwarded to the AIN SCP to allow the call to proceed to the next stage in call sequence. When the serving exchange has not detected the receipt of any supplementary digits, the audible prompt 1603 will be replayed, up to 3 times, these 3 times being calculated by the counter 1621. If on the third time no digits are detected, the call will then proceed to a verification for overflow routing 1627, and if overflow routing is possible the call will enter in the S condition 1001, otherwise it will enter the E condition 1005.

Figure 17:
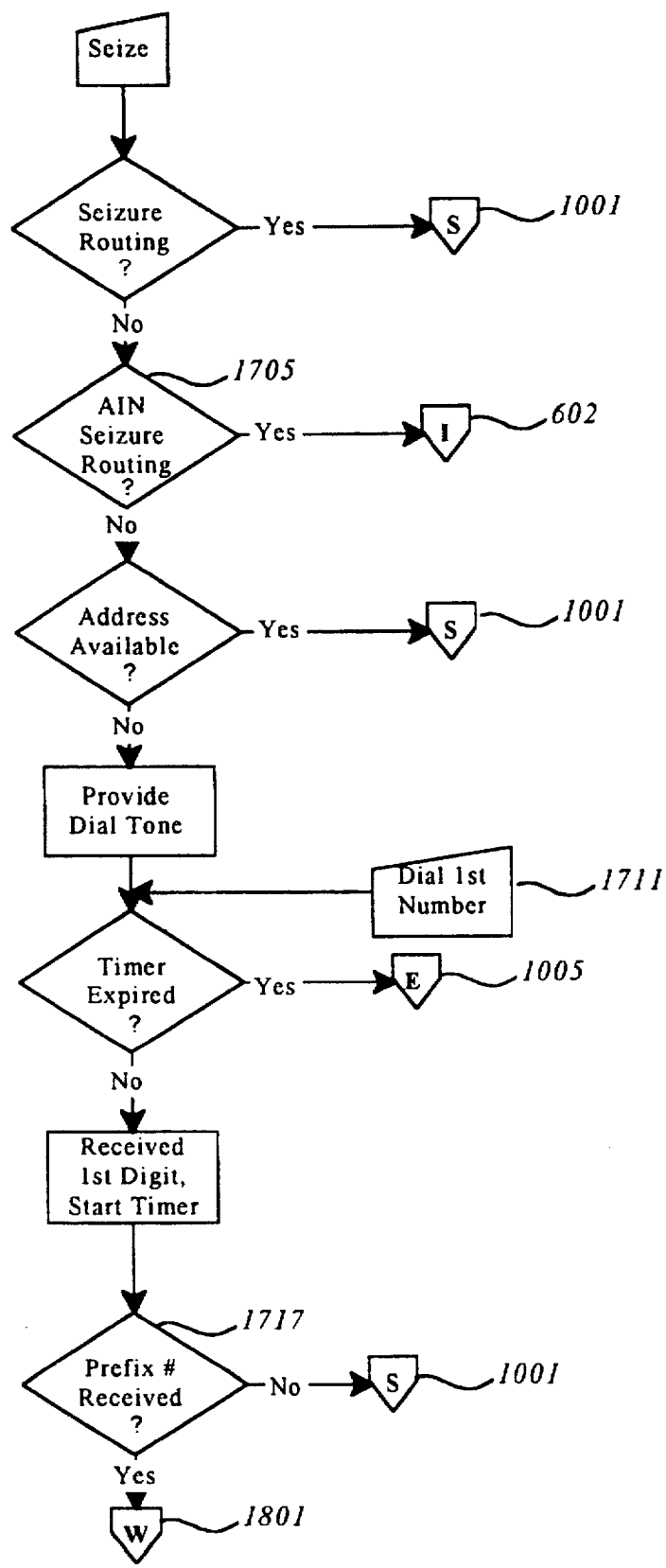
FIGS. 17 and 18 are flow diagrams illustrating call routing from non-AIN capable switches.
Figure 18:
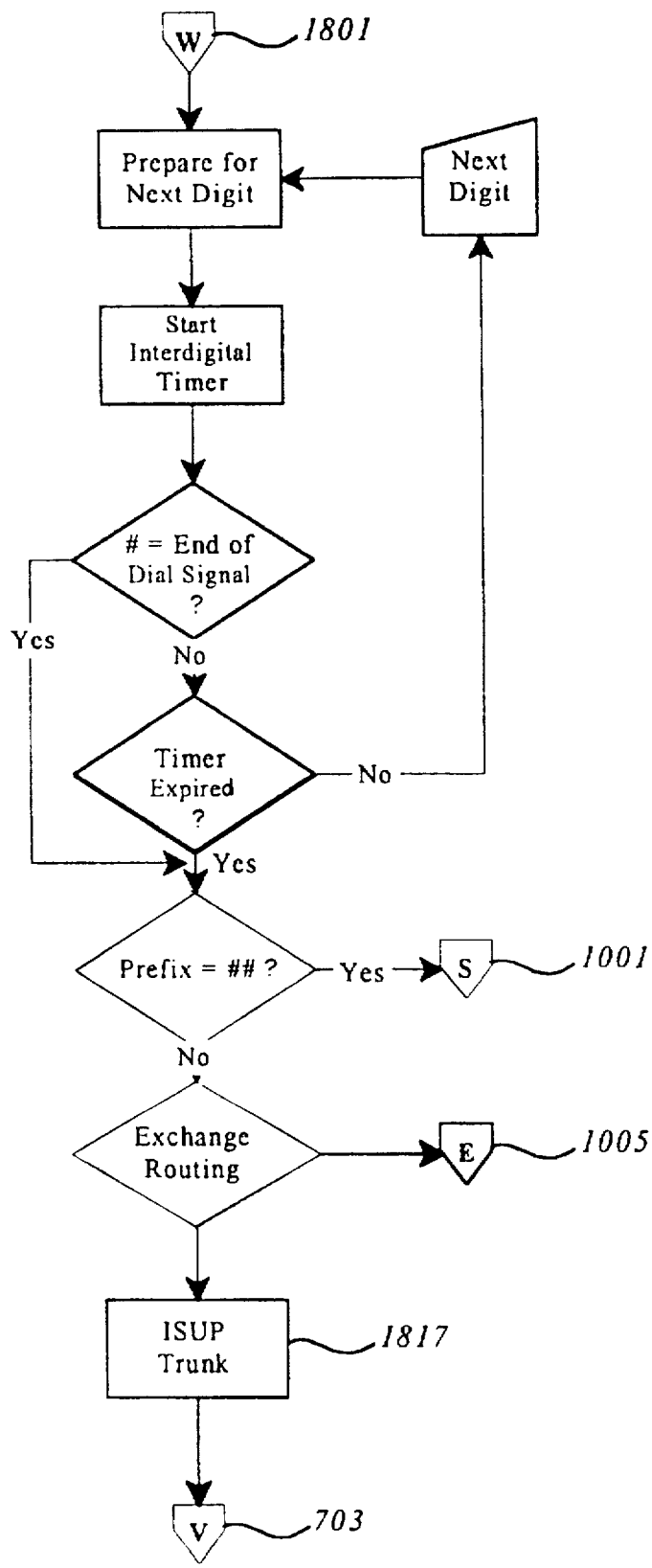

Referring now to FIGS. 17 and 18, there is shown the flow diagrams of AIN connectivity via ISUP. For performing this type of connectivity, certain modifications have to be made. On FIG. 17, if the AIN seizure routing 1705 is positive, the condition entered is an I condition 602. Secondly, the condition entered when # has been received as first digit 1717 is condition W 1801. This means that the call will route to an AIN SCP trunk to connect to the AIN serving SSP. All other digits will be routed using the existing dial plan. Then, in FIG. 18, the entering condition is the W condition 1801. Finally, when exchange routing 1815 to AIN capable SSPs is available, exchange translations will route the call to an ISUP trunk 1817 and a V condition 703 will be entered.

The 703 method and apparatus are a combination of a unique switch translations and the # key being used in a new way, which is as a mechanism to route to an office based trigger, combined with AIN being used in a way not considered before to allow for the universe of callers and a unique service based on the dialed number.

Although the present invention has been explained herein above by way of preferred embodiments thereof, it should be pointed out that any modifications to these preferred embodiments, within the scope of the appended claims, are not deemed to change or alter the nature and scope of the present invention.

We claim:

1. In a telephone network having a number of telephone switching offices equipped with SSPs (Service Switching Points) operating with AIN (Advanced Intelligent Network) application software, and a remotely located SCP (Service Control Point) adapted to receive, when required, SS7 (Signalling System 7) messages from the SSPs to translate a dialed number to enable the routing of a call on the telephone network, a method of providing a parallel, non-intrusive virtual public dial plan (VPDP), co-existing with the North American Numbering Plan (NANP), to enable a calling party to dial a virtual, public telephone number having 1 to 10 digits, each digit ranging from 0 to 9, comprising the steps of:

a) providing a VPDP access code which, when dialed by the user as a prefix to the virtual, public telephone number, enables a calling party to reach a destination station according to the VPDP, the VPDP access code comprising at least one diallable non-numeric character;

b) enabling one of the AIN capable SSPs to launch a query to the SCP when the VPDP access code is detected; and c) providing a VPDP to NANP translation table at the SCP, such that when the virtual, public telephone number dialed by the calling party is received at the SCP, the dialed number can be translated to a network access node (NNA) of said NANP for routing to the destination station.

2. A method as defined in claim 1, wherein the step of enabling one of the AIN capable SSPs further comprises the steps of:

i) providing instructions for forming, at said SSP, an SS7 message comprising the dialed virtual, public telephone number;

ii) providing instructions for sending the SS7 message from said SSP to said SCP along a common signaling channel for translation of the virtual public telephone number to a routing number corresponding to an NNA associated with the NANP.

iii) receiving the SS7 message at said SCP;

iv) translating the virtual, public telephone number in the SS7 message to a routing number corresponding to a NNA associated with the NANP; and v) sending a response SS7 message from said SCP to said SSP, said SS7 message containing said routing number, such that the call can be routed to said destination station.

3. A method as defined in claim 2, wherein the translation of the dialed virtual, public telephone number in the SS7 message further comprises the steps of:

verifying whether one or more additional digits are appended to the virtual, public telephone number indicating that the virtual, public telephone number includes a service code, and if a service code is included, determining at the SCP the routing number corresponding to an NNA associated with said service code and said virtual, public telephone number.

4. A method as defined in claim 3, wherein said NNA associated with said service code corresponds to one of a cellular number, a fax number, a modem number, a pager number and an office number.

5. A method as defined in claim 2, wherein the VPDP access code is used as an AIN trigger to instruct the SSP to form an SS7 message for sending to the SCP.

6. A method as defined in claim 5, wherein the AIN trigger is an office based trigger.

7. A method as defined in claim 6, wherein the AIN trigger is a Public Office Dial Plan trigger.

8. A method as defined in claim 5, wherein the AIN trigger is a customized dial plan trigger.

9. A method as defined in claim 5, wherein the VPDP access code is a predetermined prefix code which is not included in the SS7 message.

10. A method as defined in claim 9, wherein the predetermined prefix code is the number (#) sign.

11. A method as defined in claim 5, wherein calls having a VPDP access code, and which originate from a non-AIN capable switch, are forwarded to one of said SSPs which forms the SS7 message to query said SCP.

12. A method as defined in claim 11, wherein calls originated at non-AIN capable switches are forwarded to one of said SSPs, using an ISUP message containing a code indicative that the dialed number is to be routed according to the VPDP.

13. A method as defined in claim 11, wherein calls originated at a non-AIN capable switch are forwarded to one of said SSPs via a dedicated trunk connecting the non-AIN capable switch and the one of said SSPS, the dedicated trunk being used to provide an indication that the dialed number is to be routed according to the VPDP.

14. A method as defined in claim 11, wherein calls originated at non-AIN capable switches are forwarded to one of said SSPs, using an ISUP message containing a parameter indicative that the dialed number is to be routed according to the VPDP.

* * * * *